(12) United States Patent
Li et al.

(10) Patent No.: US 12,114,210 B2
(45) Date of Patent: Oct. 8, 2024

(54) COMMUNICATION METHOD AND APPARATUS

(71) Applicant: HUAWEI TECHNOLOGIES CO., LTD., Guangdong (CN)

(72) Inventors: Huan Li, Shenzhen (CN); Weisheng Jin, Shanghai (CN); Hualin Zhu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 473 days.

(21) Appl. No.: 17/389,782

(22) Filed: Jul. 30, 2021

(65) Prior Publication Data

US 2021/0360488 A1 Nov. 18, 2021

Related U.S. Application Data

(63) Continuation of application No. PCT/CN2020/072858, filed on Jan. 17, 2020.

(30) Foreign Application Priority Data

Jan. 31, 2019 (CN) .......................... 201910097448.2

(51) Int. Cl.
*H04W 4/00* (2018.01)
*H04W 36/00* (2009.01)
(Continued)

(52) U.S. Cl.
CPC ... *H04W 36/0007* (2018.08); *H04W 36/0033* (2013.01); *H04W 76/12* (2018.02);
(Continued)

(58) Field of Classification Search
None
See application file for complete search history.

(56) References Cited

U.S. PATENT DOCUMENTS 8,711,803 B1 * 4/2014 Wang .................. H04W 36/023
370/328
11,792,693 B2 * 10/2023 Ohlsson ............ H04W 36/0033
370/331
(Continued)

FOREIGN PATENT DOCUMENTS

CN 101094512 A 12/2007
CN 101237393 A 8/2008
(Continued)

OTHER PUBLICATIONS

Kyungjoo Suh et al., Fast Multicast Protocol for Mobile IPV6 in the fast handovers environments. draft-suh-mipshop-fmcast-mip6-00. txt. Jan. 2004, 13 pages.

(Continued)

*Primary Examiner* — Bob A Phunkulh
(74) *Attorney, Agent, or Firm* — WOMBLE BOND DICKINSON (US) LLP

(57) ABSTRACT

A communication method and an apparatus are provided, so that a terminal device can flexibly perform a handover procedure in a multicast service scenario. The method includes: sending, by a source access device, a first message to an access controller, where the first message is used to request to hand over a terminal device to a target access device, and the first message includes a multicast service context of the terminal device; and receiving, by the source access device, a fifth message from the access controller, wherein the fifth message is used to respond to the message used to request to hand over the terminal device to the target access device, and the fifth message comprises indication information indicating whether to forward multicast service data.

14 Claims, 15 Drawing Sheets

FIG. 3

(51) Int. Cl.
*H04W 76/12* (2018.01)
*H04W 76/32* (2018.01)
*H04L 12/18* (2006.01)
*H04L 65/611* (2022.01)
*H04W 4/06* (2009.01)

(52) U.S. Cl.
CPC ............ *H04W 76/32* (2018.02); *H04L 12/18* (2013.01); *H04L 65/611* (2022.05); *H04W 4/06* (2013.01)

(56) References Cited

U.S. PATENT DOCUMENTS

| | | | |
|---|---|---|---|
| 11,804,215 B1* | 10/2023 | Castellani | G10L 15/18 |
| 2008/0084847 A1* | 4/2008 | Xia | H04W 36/02 |
| | | | 370/331 |
| 2008/0132240 A1* | 6/2008 | Baek | H04W 36/026 |
| | | | 455/442 |
| 2008/0146230 A1 | 6/2008 | Pandian et al. | |
| 2008/0273503 A1* | 11/2008 | Lee | H04W 36/0055 |
| | | | 370/336 |
| 2009/0219850 A1 | 9/2009 | Lin et al. | |
| 2011/0305183 A1* | 12/2011 | Hsu | H04W 72/30 |
| | | | 370/312 |
| 2011/0305184 A1* | 12/2011 | Hsu | H04W 36/00835 |
| | | | 370/312 |
| 2014/0078923 A1* | 3/2014 | Guan | H04W 4/06 |
| | | | 370/252 |
| 2014/0286225 A1* | 9/2014 | Yu | H04W 36/08 |
| | | | 370/312 |
| 2014/0313969 A1* | 10/2014 | Kalhan | H04W 52/0203 |
| | | | 370/312 |
| 2015/0365963 A1* | 12/2015 | Won | H04W 4/06 |
| | | | 370/329 |
| 2016/0285643 A1 | 9/2016 | Verma | |
| 2016/0323784 A1* | 11/2016 | Ma | H04W 36/0022 |
| 2016/0374050 A1* | 12/2016 | Prasad | H04W 36/0007 |
| 2016/0381517 A1* | 12/2016 | Kim | H04W 76/10 |
| | | | 370/331 |
| 2017/0164143 A1 | 6/2017 | Huang et al. | |
| 2017/0366363 A1* | 12/2017 | Hong | H04W 72/23 |
| 2018/0124656 A1* | 5/2018 | Park | H04W 36/0072 |
| 2018/0124771 A1* | 5/2018 | Mok | H04W 72/51 |
| 2018/0139665 A1* | 5/2018 | Park | H04W 36/0007 |
| 2018/0160342 A1* | 6/2018 | Park | H04W 36/0033 |
| 2023/0345310 A1* | 10/2023 | Li | H04W 72/30 |
| 2024/0073752 A1* | 2/2024 | Da Silva | H04W 36/362 |

FOREIGN PATENT DOCUMENTS

| | | |
|---|---|---|
| CN | 101242340 A | 8/2008 |
| CN | 101547408 A | 9/2009 |
| CN | 102264154 A | 11/2011 |
| CN | 103067865 A | 4/2013 |
| JP | 2005354294 A | 12/2005 |
| KR | 20050075627 A | 7/2005 |
| WO | 2018162947 A1 | 9/2018 |

OTHER PUBLICATIONS

T. Schmidt et al., Multicast Listener Extensions for MIPv6 and PMIPv6 Fast Handovers. draft-ietf-multimob-fmipv6-bfmipv6-multicast-10. Oct. 16, 2014, 29 pages.

Samsung:"Group communications with early E-RAB establishment", 3GPP Draft; S2-134055,3rd Generation Partnership Project(3GPP), Mobile Competencecentre:650.Route Deslucioles F-06921 Sophia-Antipolis Cedex;Francevol. SA WG2,No. San Francisco, USA;Nov. 11-Nov. 15, 2013 Nov. 12, 2013 (Nov. 12, 2013), XP050744119total 9 pages.

* cited by examiner

COMMUNICATION METHOD AND APPARATUS

CROSS-REFERENCE TO RELATED APPLICATIONS

This application is a continuation of International Application No. PCT/CN2020/072858, filed on Jan. 17, 2020, which claims priority to Chinese Patent Application No. 201910097448.2, filed on Jan. 31, 2019, The disclosures of the aforementioned applications are hereby incorporated by reference in their entireties.

TECHNICAL FIELD

This application relates to the field of communication technologies, and in particular, to a communication method and an apparatus.

BACKGROUND

In an existing 4G communication system, a process in which a terminal device is handed over between two base stations usually involves a handover to a corresponding mobility management entity (MME) and a serving gateway (S-GW), so that a handover from a source side device to a target side device is implemented.

Currently, in the foregoing handover process, there is a fixed anchor point, for example, a packet data network gateway (P-GW). Service data of the terminal device is forwarded by using the fixed anchor point, to ensure service continuity of the terminal device.

However, in practice, in a multicast service scenario, the fixed anchor is not necessary. However, due to a limitation of the existing communication system, the fixed anchor still needs to be deployed, so that the fixed anchor participates in the handover of the terminal device. It is clear that the handover of the terminal device is inflexible and a resource waste is caused.

SUMMARY

This application provides a communication method and an apparatus, so that a terminal device can flexibly perform a handover procedure in a multicast service scenario.

According to a first aspect, this application provides a communication method, applied to a multicast service scenario. The method includes: A source access device sends a first message to an access controller, and receives a fifth message from the access controller, where the first message is used to request to hand over a terminal device to a target access device, and the first message includes a multicast service context of the terminal device; the fifth message is used to respond to the message used to request to hand over the terminal device to the target access device, and the fifth message includes indication information indicating whether to forward multicast service data.

According to the foregoing method, in a process in which the terminal device is handed over between the access devices, a handover procedure can be flexibly performed, and multicast service continuity can be ensured without requiring a fixed anchor to participate in the handover of the terminal device. In this way, a resource waste caused by deployment of the fixed anchor can be avoided.

In an embodiment, the source access device determines, based on the fifth message, whether the target access device subscribes to a multicast service currently performed by the terminal device. In this way, the target access device may be subsequently notified of joining the multicast service currently performed by the terminal device.

In an embodiment, when the target access device does not subscribe to the multicast service currently performed by the terminal device, the source access device notifies the terminal device to subscribe to, through the target access device, the multicast service currently performed by the terminal device. In this way, the target access device can subscribe to the multicast service.

In an embodiment, that the source access device determines, based on the fifth message, whether the target access device subscribes to a multicast service currently performed by the terminal device may specifically include the following three cases:

When the fifth message further includes an identifier of a multicast service currently subscribed to or carried by the target access device, the source access device determines, based on the identifier of the multicast service currently subscribed to or carried by the target access device, whether the target access device subscribes to the multicast service currently performed by the terminal device; or when the fifth message further includes information indicating that the target access device does not subscribe to the multicast service currently performed by the terminal device, the source access device determines, based on the information, that the target access device does not subscribe to the multicast service currently performed by the terminal device; or when the indication information that indicates whether to forward the multicast service data and that is included in the fifth message indicates to forward the multicast service data, the source access device determines that the target access device does not subscribe to the multicast service currently performed by the terminal device.

According to the foregoing method, the source access device can accurately determine that the target access device does not subscribe to the multicast service currently performed by the terminal device.

In an embodiment, when the indication information indicates to forward the multicast service data, the method further includes: When the fifth message further includes a forwarding tunnel endpoint identifier of the target access device, the source access device establishes, based on the forwarding tunnel endpoint identifier of the target access device, a tunnel for forwarding the multicast service data; or when the fifth message further includes a forwarding tunnel endpoint identifier of the access controller, the source access device establishes, based on the forwarding tunnel endpoint identifier of the access controller, a tunnel for forwarding the multicast service data.

According to the foregoing method, the source access device can subsequently forward the multicast service data based on an actual case.

In an embodiment, when the indication information indicates to forward the multicast service data, the source access device receives an eighth message from the access controller, and deletes the tunnel for forwarding the multicast service data, where the eighth message is used to request to stop transmission of the data. In this way, the source access device can stop transmitting the multicast service data to the target access device.

In an embodiment, when the indication information indicates to forward the multicast service data, and when sending the multicast service data to the target access device for the first time, the source access device starts a data forwarding timer; when the data forwarding timer expires, the source access device sends a ninth message to the target access device, and deletes the tunnel for forwarding the multicast service data, where the ninth message is used to indicate that the data has been forwarded; or when the data forwarding timer expires, the source access device sends a tenth message to the target access device through the access controller, and deletes the tunnel for forwarding the multicast service data, where the tenth message is used to indicate that the data has been forwarded.

According to the foregoing method, the forwarding of the multicast service data between the source access device and the target access device can be stopped.

According to a second aspect, this application provides a communication method, applied to a multicast service scenario. The method includes: An access controller receives a first message from a source access device, sends a second message to a target access device, receives a fourth message from the target access device, and sends a fifth message to the source access device, where the first message is used to request to hand over a terminal device to the target access device, and the first message includes a multicast service context of the terminal device; the second message is used to request to hand over the terminal device to the target access device, and the second message includes the multicast service context of the terminal device; the fourth message is used to respond to the message used to request to hand over the terminal device to the target access device; the fifth message is used to respond to the message used to request to hand over the terminal device to the target access device, and the fifth message includes indication information indicating whether to forward multicast service data.

According to the foregoing method, in a process in which the terminal device is handed over between the access devices, a handover procedure can be flexibly performed, and multicast service continuity can be ensured without requiring a fixed anchor to participate in the handover of the terminal device. In this way, a resource waste caused by deployment of the fixed anchor can be avoided.

In an embodiment, that the fifth message includes indication information indicating whether to forward multicast service data may specifically include: When the fourth message includes the indication information indicating whether to forward the multicast service data, the access controller includes, in the fifth message, the indication information that indicates whether to forward the multicast service data and that is included in the fourth message; or the access controller includes, in the fifth message based on whether the target access device subscribes to a multicast service currently performed by the terminal device, the indication information indicating whether to forward the multicast service data.

According to the foregoing method, the access controller can flexibly include, in the fifth message, the indication information indicating whether to forward the multicast service data, so that the source access device subsequently performs a corresponding procedure operation based on the indication information.

In an embodiment, when the target access device does not subscribe to the multicast service currently performed by the terminal device, the access controller adds the target access device to the multicast service currently performed by the terminal device.

According to the foregoing method, the target access device that does not subscribe to the multicast service currently performed by the terminal device can be added to the corresponding multicast service, to implement the service continuity.

In an embodiment, when the access controller determines that a protocol of a tunnel that is for transmitting the multicast service data and that is between the access controller and the target access device is GTP-U, the second message further includes first multicast tunnel establishment information, where the first multicast tunnel establishment information is used to establish the tunnel for transmitting the multicast service data.

According to the foregoing method, the tunnel that is for transmitting the multicast service data and that is between the access controller and the target access device is subsequently established.

In an embodiment, when the indication information indicates to forward the multicast service data, the fourth message further includes a forwarding tunnel endpoint identifier of the target access device, and the fifth message further includes the forwarding tunnel endpoint identifier of the target access device; or the fourth message further includes a forwarding tunnel endpoint identifier of the target access device, and the fifth message further includes a forwarding tunnel endpoint identifier of the access controller.

According to the foregoing method, the source access device can subsequently forward the multicast service data based on an actual case.

In an embodiment, when the indication information indicates to forward the multicast service data, the access controller receives an eighth message from the target access device, where the eighth message is used to request to stop transmission of the data; the access controller sends the eighth message to the source access device.

According to the foregoing method, the source access device can stop transmitting the multicast service data to the target access device.

In an embodiment, when the indication information indicates to forward the multicast service data, the access controller receives a tenth message from the source access device, where the tenth message is used to indicate that the data has been forwarded; the access controller forwards the tenth message to the target access device.

According to the foregoing method, the forwarding of the multicast service data between the source access device and the target access device can be stopped.

According to a third aspect, this application provides a communication method, applied to a multicast service scenario. The method includes: A target access device receives a second message from an access controller, and sends a fourth message to the access controller, where the second message is used to request to hand over a terminal device to the target access device, and the second message includes a multicast service context of the terminal device; the fourth message is used to respond to the message used to request to hand over the terminal device to the target access device.

According to the foregoing method, in a process in which the terminal device is handed over between access devices, a handover procedure can be flexibly performed, and multicast service continuity can be ensured without requiring a fixed anchor to participate in the handover of the terminal device. In this way, a resource waste caused by deployment of the fixed anchor can be avoided.

In an embodiment, the fourth message includes indication information indicating whether to forward multicast service data. In this way, in a subsequent process, a source access device can determine, based on the indication information, whether the multicast service data needs to be forwarded.

In an embodiment, the second message further includes first multicast tunnel establishment information, where the first multicast tunnel establishment information is used to establish a tunnel for transmitting the multicast service data. In this way, the tunnel that is for transmitting the multicast service data and that is between the access controller and the target access device can be established.

In an embodiment, the fourth message further includes second multicast tunnel establishment information, where the second multicast tunnel establishment information is used to establish the tunnel for transmitting the multicast service data. In this way, the tunnel that is for transmitting the multicast service data and that is between the access controller and the target access device can be established.

In an embodiment, the fourth message further includes a forwarding tunnel endpoint identifier of the target access device. In this way, in a subsequent process, the access controller can forward the forwarding tunnel endpoint identifier of the target access device to the source access device based on an actual case, or the access controller establishes, based on the forwarding tunnel endpoint identifier of the target access device, a tunnel for forwarding the multicast service data, so that the source access device subsequently forwards the multicast service data.

In an embodiment, after the target access device receives the second message from the access controller, when determining, based on the multicast service context of the terminal device, that the target access device does not subscribe to a multicast service currently performed by the terminal device, the target access device sends a third message to a multicast source device, where the third message is used to subscribe to the multicast service currently performed by the terminal device.

According to the foregoing method, the target access device that does not subscribe to the multicast service currently performed by the terminal device can be added to the corresponding multicast service, to implement service continuity.

In an embodiment, when receiving the multicast service data from the source access device, the target access device starts a data forwarding timer; when the data forwarding timer expires, the target access device starts a tunnel deletion timer, and sends an eighth message to the access controller, where the eighth message is used to request to stop transmission of the data; when the tunnel deletion timer expires, the target access device deletes the tunnel for forwarding the multicast service data.

According to the foregoing method, the forwarding of the multicast service data between the source access device and the target access device can be stopped.

In an embodiment, after receiving a ninth message from the source access device, the target access device deletes the tunnel for forwarding the multicast service data, where the ninth message is used to indicate that the data has been forwarded; or after receiving, from the access controller, a tenth message from the source access device, the target access device deletes the tunnel for forwarding the multicast service data, where the tenth message is used to indicate that the data has been forwarded.

According to the foregoing method, the forwarding of the multicast service data between the source access device and the target access device can be stopped.

In an embodiment, when receiving the multicast service data from the source access device, the target access device starts a data forwarding timer; when the data forwarding timer expires, the target access device deletes the tunnel for forwarding the multicast service data.

According to the foregoing method, the forwarding of the multicast service data between the source access device and the target access device can be stopped.

According to a fourth aspect, this application provides a communication method, applied to a multicast service scenario. The method includes: A terminal device receives a sixth message from a source access device, where the sixth message includes notification information of subscribing to a multicast service currently performed by the terminal device; the terminal device sends a seventh message to a target access device, where the seventh message is used to indicate that the target access device does not subscribe to the multicast service currently performed by the terminal device, or request the target access device to subscribe to the multicast service currently performed by the terminal device; the target access device sends a nineteenth message to a multicast source device, where the nineteenth message is used to indicate that the multicast source device adds the target access device to the multicast service currently performed by the terminal device.

According to the foregoing method, the target access device that does not subscribe to the multicast service currently performed by the terminal device can be added to the corresponding multicast service, to implement service continuity.

According to a fifth aspect, this application provides a multicast service information configuration method. The method includes: An access device sends a thirteenth message to an access controller, where the thirteenth message includes a protocol that is of a tunnel for transmitting multicast service data and that is supported by the access device; the access device receives a fourteenth message from the access controller, where the fourteenth message is used to respond to the thirteenth message, and the fourteenth message includes a protocol that is of the tunnel for transmitting the multicast service data and that is supported by the access controller.

According to the foregoing method, the protocol of the tunnel that is for transmitting the multicast service data and that is between the access device and the access controller can be negotiated, so that the tunnel for transmitting the multicast service data can be subsequently established.

In an embodiment, when the protocol that is of the tunnel for transmitting the multicast service data and that is supported by the access device is GTP-U, the thirteenth message further includes a tunnel endpoint identifier of the access device. In this way, the tunnel that is for transmitting the multicast service data and that is between the access device and the access controller can be established.

In an embodiment, when the protocol that is of the tunnel for transmitting the multicast service data and that is supported by the access controller is the GTP-U, the fourteenth message further includes a tunnel endpoint identifier of the access controller. In this way, the tunnel that is for transmitting the multicast service data and that is between the access device and the access controller can be established.

According to a sixth aspect, this application provides a multicast service establishment method. The method includes: An access device receives a fifteenth message from a terminal device, where the fifteenth message is used to request to establish a multicast service, and the fifteenth message includes an address of the multicast service and an identifier of the terminal device; the access device sends a sixteenth message to an access controller, where the sixteenth message is used to request to establish the multicast service, and the sixteenth message includes the identifier of the terminal device and the address of the multicast service;

the access device receives a seventeenth message from the access controller, where the seventeenth message is used to indicate that the terminal device is allowed to establish the multicast service, and the seventeenth message includes the identifier of the terminal device and the address of the multicast service.

According to the foregoing method, the multicast service can be established, so that the terminal device subsequently performs the required multicast service.

In an embodiment, the sixteenth message further includes first multicast tunnel establishment information, where the first multicast tunnel establishment information is used to establish a tunnel for transmitting multicast service data. In this way, the tunnel that is for transmitting the multicast service data and that is between the access device and the access controller can be established in a subsequent process.

In an embodiment, the seventeenth message further includes second multicast tunnel establishment information, where the second multicast tunnel establishment information is used to establish the tunnel for transmitting the multicast service data. In this way, the tunnel that is for transmitting the multicast service data and that is between the access device and the access controller can be established in a subsequent process.

In an embodiment, when determining that the access device does not subscribe to the multicast service, the access device sends an eighteenth message to the access controller or a multicast source device, where the eighteenth message is used to subscribe to the multicast service.

According to the foregoing method, the target access device that does not subscribe to the multicast service currently performed by the terminal device can be added to the corresponding multicast service, to implement service continuity.

According to a seventh aspect, this application provides a multicast service establishment method. The method includes: An access controller receives a sixteenth message from an access device, where the sixteenth message is used to request to establish a multicast service, and the sixteenth message includes an identifier of a terminal device and an address of the multicast service; the access controller sends a seventeenth message to the access device, where the seventeenth message is used to indicate that the terminal device is allowed to establish the multicast service, and the seventeenth message includes the identifier of the terminal device and the address of the multicast service.

According to the foregoing method, the multicast service can be established, so that the terminal device subsequently performs the required multicast service.

In an embodiment, the sixteenth message further includes first multicast tunnel establishment information, where the first multicast tunnel establishment information is used to establish a tunnel for transmitting multicast service data. In this way, the tunnel that is for transmitting the multicast service data and that is between the access device and the access controller can be established in a subsequent process.

In an embodiment, the seventeenth message further includes second multicast tunnel establishment information, where the second multicast tunnel establishment information is used to establish the tunnel for transmitting the multicast service data. In this way, the tunnel that is for transmitting the multicast service data and that is between the access device and the access controller can be established in a subsequent process.

In an embodiment, the access controller receives an eighteenth message from the access device, where the eighteenth message is used to subscribe to the multicast service; the access controller adds the access device to the multicast service.

According to the foregoing method, the target access device that does not subscribe to the multicast service currently performed by the terminal device can be added to the corresponding multicast service, to implement service continuity.

According to an eighth aspect, this application further provides a source access device. The source access device has a function of implementing behavior of the source access device in the method example in the first aspect. The function may be implemented by hardware, or may be implemented by hardware by executing corresponding software. The hardware or software includes one or more modules corresponding to the function.

In an embodiment, a structure of the source access device includes a sending unit, a receiving unit, and a processing unit. These units may perform corresponding functions in the method example in the first aspect. For details, refer to detailed descriptions in the method example. Details are not described herein again.

In an embodiment, a structure of the source access device includes a transceiver and a processor, and optionally further includes a memory. The transceiver is configured to send and receive data, and is configured to communicate and interact with another device in a communication system. The processor is configured to support the source access device in performing a corresponding function in the method in the first aspect. The memory is coupled to the processor, and stores program instructions and data for the source access device.

According to a ninth aspect, this application further provides an access controller. The access controller has a function of implementing behavior of the access controller in the method example in the second aspect. The function may be implemented by hardware, or may be implemented by hardware by executing corresponding software. The hardware or software includes one or more modules corresponding to the function.

In an embodiment, a structure of the access controller includes a sending unit, a receiving unit, and a processing unit. These units may perform corresponding functions in the method example in the second aspect. For details, refer to detailed descriptions in the method example. Details are not described herein again.

In an embodiment, a structure of the access controller includes a transceiver and a processor, and optionally further includes a memory. The transceiver is configured to send and receive data, and is configured to communicate and interact with another device in a communication system. The processor is configured to support the access controller in performing a corresponding function in the method in the second aspect. The memory is coupled to the processor, and stores program instructions and data for the access controller.

According to a tenth aspect, this application further provides a target access device. The target access device has a function of implementing behavior of the target access device in the method example in the third aspect. The function may be implemented by hardware, or may be implemented by hardware by executing corresponding software. The hardware or software includes one or more modules corresponding to the function.

In an embodiment, a structure of the target access device includes a sending unit, a receiving unit, and a processing unit. These units may perform corresponding functions in the method example in the third aspect. For details, refer to detailed descriptions in the method example. Details are not described herein again.

In an embodiment, a structure of the target access device includes a transceiver and a processor, and optionally further includes a memory. The transceiver is configured to send and receive data, and is configured to communicate and interact with another device in a communication system. The processor is configured to support the target access device in performing a corresponding function in the method in the third aspect. The memory is coupled to the processor, and stores program instructions and data for the target access device.

According to an eleventh aspect, this application further provides a terminal device. The terminal device has a function of implementing behavior of the terminal device in the method example in the fourth aspect. The function may be implemented by hardware, or may be implemented by hardware by executing corresponding software. The hardware or software includes one or more modules corresponding to the function.

In an embodiment, a structure of the terminal device includes a sending unit, a receiving unit, and a processing unit. These units may perform corresponding functions in the method example in the fourth aspect. For details, refer to detailed descriptions in the method example. Details are not described herein again.

In an embodiment, a structure of the terminal device includes a transceiver and a processor, and optionally further includes a memory. The transceiver is configured to send and receive data, and is configured to communicate and interact with another device in a communication system. The processor is configured to support the terminal device in performing a corresponding function in the method in the fourth aspect. The memory is coupled to the processor, and stores program instructions and data for the terminal device.

According to a twelfth aspect, this application further provides an access device. The access device has a function of implementing behavior of the access device in the method example in the fifth aspect. The function may be implemented by hardware, or may be implemented by hardware by executing corresponding software. The hardware or software includes one or more modules corresponding to the function.

In an embodiment, a structure of the access device includes a sending unit, a receiving unit, and a processing unit. These units may perform corresponding functions in the method example in the fifth aspect. For details, refer to detailed descriptions in the method example. Details are not described herein again.

In an embodiment, a structure of the access device includes a transceiver and a processor, and optionally further includes a memory. The transceiver is configured to send and receive data, and is configured to communicate and interact with another device in a communication system. The processor is configured to support the access device in performing a corresponding function in the method in the fifth aspect. The memory is coupled to the processor, and stores program instructions and data for the access device.

According to a thirteenth aspect, this application further provides an access controller. The access controller has a function of implementing behavior of the access controller in the method example in the fifth aspect. The function may be implemented by hardware, or may be implemented by hardware by executing corresponding software. The hardware or software includes one or more modules corresponding to the function.

In an embodiment, a structure of the access controller includes a sending unit, a receiving unit, and a processing unit. These units may perform corresponding functions in the method example in the fifth aspect. For details, refer to detailed descriptions in the method example. Details are not described herein again.

In an embodiment, a structure of the access controller includes a transceiver and a processor, and optionally further includes a memory. The transceiver is configured to send and receive data, and is configured to communicate and interact with another device in a communication system. The processor is configured to support the access controller in performing a corresponding function in the method in the fifth aspect. The memory is coupled to the processor, and stores program instructions and data for the access controller.

According to a fourteenth aspect, this application further provides an access device. The access device has a function of implementing behavior of the access device in the method example in the sixth aspect. The function may be implemented by hardware, or may be implemented by hardware by executing corresponding software. The hardware or software includes one or more modules corresponding to the function.

In an embodiment, a structure of the access device includes a sending unit, a receiving unit, and a processing unit. These units may perform corresponding functions in the method example in the sixth aspect. For details, refer to detailed descriptions in the method example. Details are not described herein again.

In an embodiment, a structure of the access device includes a transceiver and a processor, and optionally further includes a memory. The transceiver is configured to send and receive data, and is configured to communicate and interact with another device in a communication system. The processor is configured to support the access device in performing a corresponding function in the method in the sixth aspect. The memory is coupled to the processor, and stores program instructions and data for the access device.

According to a fifteenth aspect, this application further provides an access controller. The access controller has a function of implementing behavior of the access controller in the method example in the seventh aspect. The function may be implemented by hardware, or may be implemented by hardware by executing corresponding software. The hardware or software includes one or more modules corresponding to the function.

In an embodiment, a structure of the access controller includes a sending unit, a receiving unit, and a processing unit. These units may perform corresponding functions in the method example in the seventh aspect. For details, refer to detailed descriptions in the method example. Details are not described herein again.

In an embodiment, a structure of the access controller includes a transceiver and a processor, and optionally further includes a memory. The transceiver is configured to send and receive data, and is configured to communicate and interact with another device in a communication system. The processor is configured to support the access controller in performing a corresponding function in the method in the seventh aspect. The memory is coupled to the processor, and stores program instructions and data for the access controller.

According to a sixteenth aspect, this application further provides a system. The system includes a source access device, and the source access device may be configured to perform the operations performed by the source access device in the embodiments described with respect to the first aspect. In an embodiment, the system may further include an access controller, and the access controller may be configured to perform the operations performed by the access controller in the embodiments described with respect to the first aspect. In an embodiment, the system may further include a target access device, and the target access device may be configured to perform the operations performed by the target access device in the embodiments described with respect to the first aspect. In an embodiment, the system may further include another device, for example, a terminal device that interacts with one or more of the source access device, the access controller, and the target access device in the solutions provided in the embodiments of this application.

According to a seventeenth aspect, this application further provides a system. The system includes an access controller, and the access controller may be configured to perform the operations performed by the access controller in the embodiments described with respect to the second aspect. In an embodiment, the system may further include a source access device, and the source access device may be configured to perform the operations performed by the source access device in the embodiments described with respect to the second aspect. In an embodiment, the system may further include a target access device, and the target access device may be configured to perform the operations performed by the target access device in the embodiments described with respect to the second aspect. In an embodiment, the system may further include another device, for example, a terminal device that interacts with one or more of the source access device, the access controller, and the target access device in the solutions provided in the embodiments of this application.

According to an eighteenth aspect, this application further provides a system. The system includes a target access device, and the target access device may be configured to perform the operations performed by the target access device in the embodiments described with respect to the third aspect. In an embodiment, the system may further include a source access device, and the source access device may be configured to perform the operations performed by the source access device in the embodiments described with respect to the third aspect. In an embodiment, the system may further include an access controller, and the access controller may be configured to perform the operations performed by the access controller in the embodiments described with respect to the third aspect. In an embodiment, the system may further include another device, for example, a terminal device that interacts with one or more of the source access device, the access controller, and the target access device in the solutions provided in the embodiments of this application.

According to a nineteenth aspect, this application further provides a system. The system includes a terminal device, and the terminal device may be configured to perform the operations performed by the terminal device in the embodiments described with respect to the fourth aspect. In an embodiment, the system may further include a target access device, and the target access device may be configured to perform the operations performed by the target access device in the embodiments described with respect to the fourth aspect. In an embodiment, the system may further include another device that interacts with one or both of the terminal device and/or the target access device in the solutions provided in the embodiments of this application.

According to a twentieth aspect, this application further provides a system. The system includes an access device, and the access device may be configured to perform the operations performed by the access device in the embodiments described with respect to the fifth aspect or the embodiments described with respect to the sixth aspect. In an embodiment, the system may further include an access controller, and the access controller may be configured to perform the operations performed by the access controller in the embodiments described with respect to the fifth aspect or the embodiments described with respect to the sixth aspect. In an embodiment, the system may further include another device, for example, a terminal device that interacts with one or both of the access controller and/or the access device in the solutions provided in the embodiments of this application.

According to a twenty-first aspect, this application further provides a system. The system includes an access controller, and the access controller may be configured to perform the operations performed by the access controller in the embodiments described with respect to the fifth aspect or the embodiments described with respect to the seventh aspect. In an embodiment, the system may further include an access device, and the access device may be configured to perform the operations performed by the access device in the embodiments described with respect to the fifth aspect or the embodiments described with respect to the seventh aspect. In an embodiment, the system may further include another device, for example, a terminal device that interacts with one or both of the access controller and/or the access device in the solutions provided in the embodiments of this application.

According to a twenty-second aspect, this application further provides a computer storage medium. The computer storage medium stores computer execution instructions. When the computer execution instructions are invoked by a computer, the computer is enabled to perform any one of the foregoing methods.

According to a twenty-third aspect, this application further provides a computer program product including instructions. When the computer program product runs on a computer, the computer is enabled to perform any one of the foregoing methods.

According to a twenty-fourth aspect, this application further provides a chip. The chip is coupled to a memory, and is configured to read and execute program instructions stored in the memory, to implement any one of the foregoing methods.

DESCRIPTION OF EMBODIMENTS

The following further describes this application in detail with reference to the accompanying drawings.

Embodiments of this application provides a communication method and an apparatus, so that a terminal device can flexibly perform a handover procedure in a multicast service scenario. The method and the apparatus in this application are based on a same inventive concept. The method and the apparatus have similar problem resolving principles. Therefore, for the apparatus and the method, mutual reference may be made to each other. Details of repeated parts are not described.

The following describes some terms in this application, to facilitate understanding of a person skilled in the art.

(1) A source access device and a target access device each may provide an access management function, an authentication function, a mobility management function, a session management function, and the like for a terminal device. The source access device and the target access device each may serve as an egress gateway of a locally forwarded data connection to communicate with an external public data network (PDN), and may also serve as an anchor point of a data connection when the terminal device moves. In the embodiments of this application, the source access device and the target access device may be but are not limited to a wireless broadband access point (WBAP), support a WB-Uu interface between the access device and the terminal device, and support a WB-1 interface between the access device and an access controller. The source access device and the target access device may terminate air interface signaling and a non-access stratum (NAS) message.

(2) An access controller may provide a user subscription storage and management function, a mobility management function, a policy control function, an access device configuration management function, and the like. The access controller may serve as an egress gateway of a data connection forwarded in a centralized manner, to communicate with an external PDN, and may serve as an anchor point of a data connection when a terminal device moves. In this application, the access controller may be but is not limited to a wireless broadband access controller (WBAC), and may support a WB-1 interface between the access controller and an access device (for example, a WBAP).

(3) In the descriptions of this application, terms such as "first" and "second" are merely used for distinction and description, and shall not be understood as an indication or implication of relative importance or an indication or implication of an order.

To describe technical solutions in the embodiments of this application more clearly, the following describes the communication method and the apparatus according to the embodiments of this application in detail with reference to the accompanying drawings.

Figure 1:
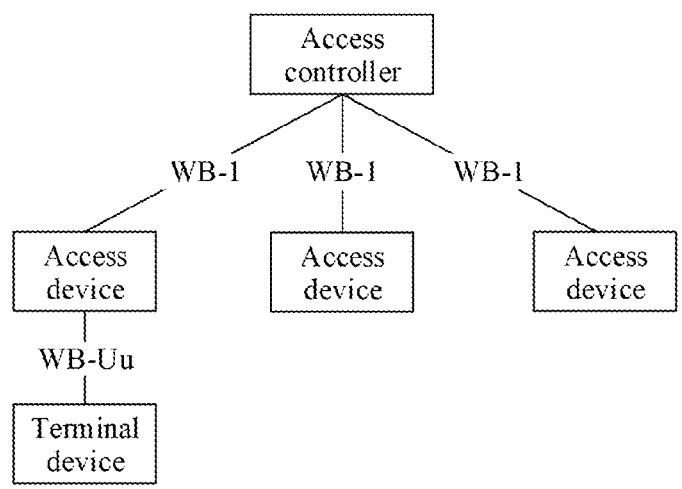
FIG. 1 is a schematic diagram of an architecture of a communication system according to this application.

FIG. 1 shows a possible architecture of a communication system to which a communication method according to an embodiment of this application is applicable. The architecture of the communication system may include an access controller, at least one access device, and at least one terminal device. The access controller may be connected to the at least one access device through a WB-1 interface, and the access device may be connected to the terminal device through a WB-Uu interface. An interface name is merely an example for description, and is not specifically limited in the embodiments of this application. It should be understood that the embodiments of this application is not limited to being applied to the communication system shown in FIG. 1. The names of the devices shown in FIG. 1 are merely used as examples for description herein, and are not used as limitations on the devices included in the architecture of the communication system to which the communication method in this application is applicable. Functions of the network elements or the devices in the communication system are described in detail below.

The terminal device is a device that provides voice and/or data connectivity for a user. The terminal device may support a NAS message defined in 3GPP. For example, in 5G, the terminal device may be wireless broadband customer-premises equipment (WBCPE). In future communication, for example, in 6G, the terminal device may still be WBCPE or have another name. This is not limited in this application.

The access device may provide an access management function, an authentication function, a mobility management function, a session management function, and the like for the terminal device. The access device may serve as an egress gateway of a locally forwarded data connection to communicate with an external PDN, and may also serve as an anchor point of the data connection when the terminal device moves. The access device may terminate air interface signaling and the NAS message. For example, in 5G, the access device may be a WBAP. In future communication, for example, in 6G, the access device may still be a WBAP or have another name. This is not limited in this application.

The access controller may provide a user subscription storage and management function, a mobility management function, a policy control function, an access device configuration management function, and the like. The access controller may serve as an egress gateway of a data connection forwarded in a centralized manner, to communicate with an external PDN, and may also serve as an anchor point of the data connection when the terminal device moves. For example, in 5G, the access controller may be a WBAC. In future communication, for example, in 6G, the access controller may still be a WBAC or have another name. This is not limited in this application.

It should be noted that the architecture of the communication system shown in FIG. 1 is not limited to including only the devices shown in the figure, and may further include another device not shown in the figure. Details are not described herein in this application one by one.

It should be noted that a distribution form of the devices is not limited in the embodiments of this application. The distribution form shown in FIG. 1 is merely an example, and is not limited in this application.

It should be noted that the communication system shown in FIG. 1 does not constitute a limitation on a communication system to which the embodiments of this application are applicable. The architecture of the communication system shown in FIG. 1 is a 5G system architecture. Optionally, the method in the embodiments of this application is further applicable to various future communication systems, for example, a 6G or another communication network.

Figure 2:
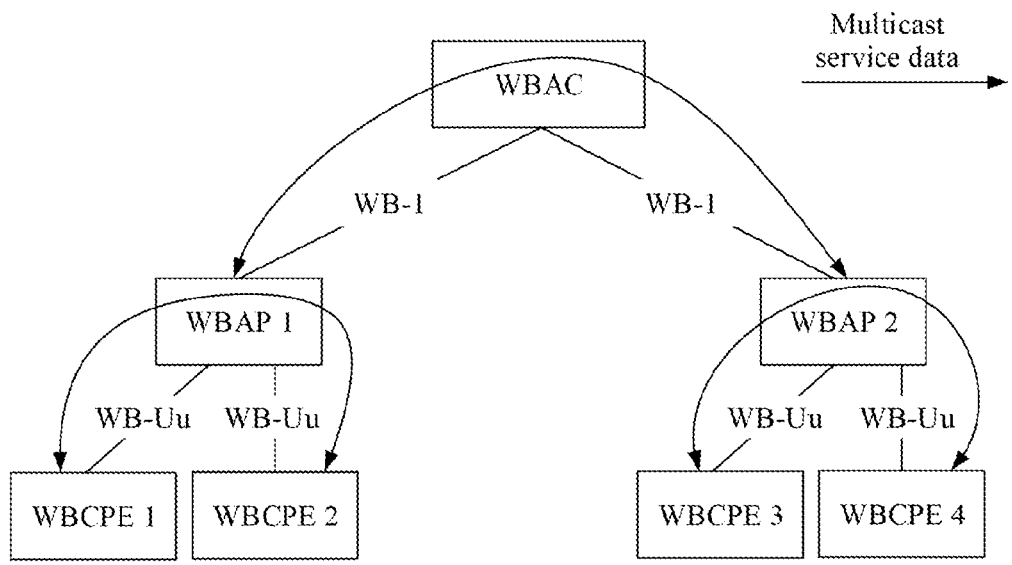
FIG. 2 is a schematic diagram of a multicast structure according to this application.
Figure 3:
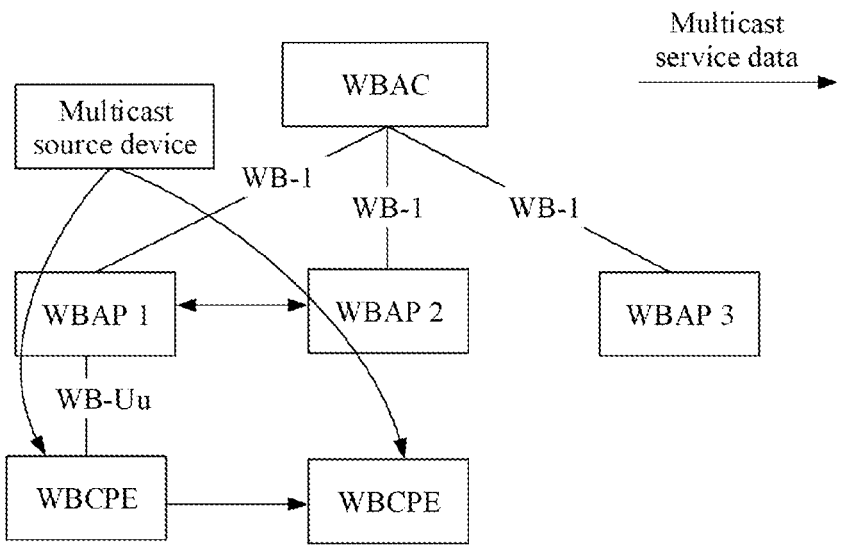
FIG. 3 is another schematic diagram of a multicast structure according to this application.

Based on the communication system shown in FIG. 1, an embodiment of this application provides two multicast architectures, which are respectively shown in FIG. 2 and FIG. 3. In FIG. 2 and FIG. 3, an example in which an access device is a WBAP, an access controller is a WBAC, and a terminal device is WBCPE is used for description. Specifically, in the multicast architecture shown in FIG. 2, a multicast channel is established between the WBAC and the WBAP. The WBAC forwards multicast service data to the WBAP in a centralized manner, and then the WBAP forwards the multicast service data to the corresponding WBCPE. In the multicast architecture shown in FIG. 3, the multicast service data is sent to the WBAP through an external multicast source device, and then the WBAP forwards the multicast service data to the corresponding WBCPE. It should be noted that, in the multicast architecture shown in FIG. 2, the WBAC may be considered as a multicast source device, and has a function that is of the multicast source device and that is of forwarding the multicast service data. It should be noted that the multicast service data in this application may also be referred to as a multicast service data packet.

Figure 4:
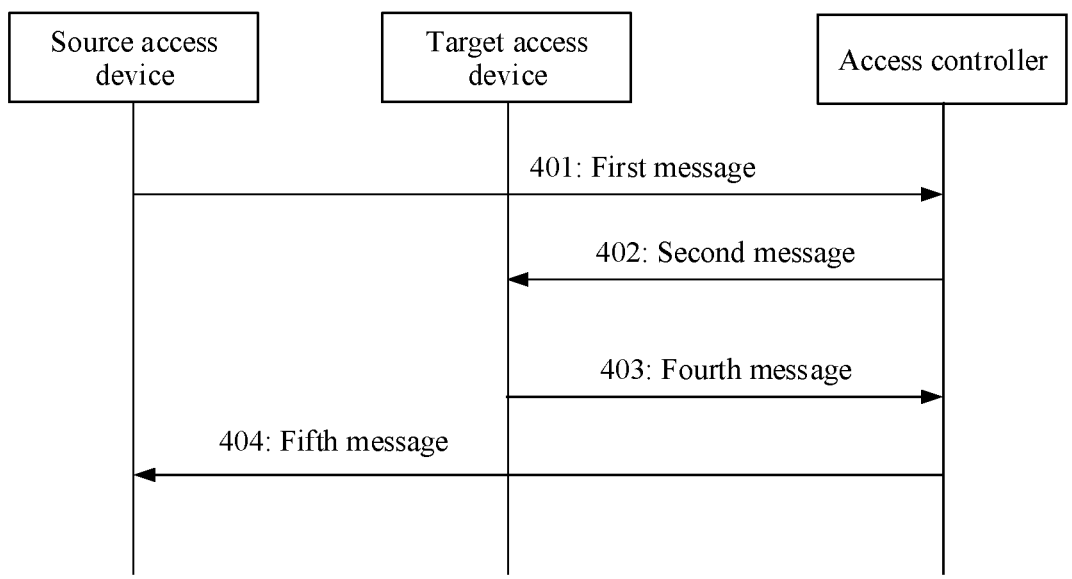
FIG. 4 is a flowchart of a communication method according to this application.

A communication method according to an embodiment of this application is applicable to the communication system shown in FIG. 1, and is applicable to the multicast architecture shown in FIG. 2 or FIG. 3. Referring to FIG. 4, a procedure of the method may include the following operations.

Operation 401: A source access device sends a first message to an access controller, where the first message is used to request to hand over a terminal device to a target access device, and the first message includes a multicast service context of the terminal device.

The first message may be a relocation request (Relocation Request) (namely, a handover request) sent by the source access device to the access controller.

In an embodiment, the multicast service context of the terminal device may include, but is not limited to, information such as an identifier of a multicast group that the terminal device requests to join, a multicast address (namely, a destination address to which a multicast packet needs to be forwarded), and a multicast source address.

In an embodiment, after receiving the first message, the access controller may determine, based on the multicast service context that is of the terminal device and that is in the first message, whether the target access device subscribes to a multicast service currently performed by the terminal device. When determining that the target access device does not subscribe to the multicast service currently performed by the terminal device, the access controller adds the target access device to the multicast service currently performed by the terminal device. For example, the access controller may determine, based on the identifier of the multicast group that is included in the first message and that the terminal device requests to join, the multicast service performed by the terminal device, then learn, based on locally stored related information of the target access device, that the target access device has subscribed to the multicast service, and determine, based on this, whether the target access device subscribes to the multicast service currently performed by the terminal device.

In an embodiment, the first message may further carry first information, and the first information may include one or more of the following information: connection context information of a connection established by the terminal device in the source access device, a mobility management context of the terminal device, and a source access device to target access device container (Source WBAP to Target WBAP container). The Source WBAP to Target WBAP container may include one or more first parameters, and the first parameter may be a parameter required when the terminal device is handed over. The first message may further carry an identifier of the target access device. Certainly, the first message may further carry other information. This is not listed one by one in this embodiment of this application. The connection context information in the embodiments of this application may include one or more of the following information: PDN context information, PDU context information, and bearer context information.

A specific protocol type of the message in the embodiments of this application may be the control and provisioning of wireless access points (CAPWAP) protocol, the simple network management protocol (SNMP), or another protocol. A protocol type of the message is not specifically limited in the embodiments of this application. For ease of description, the CAPWAP protocol is used as an example to describe the message in the embodiments of this application.

When the CAPWAP protocol is used as an example, the message in the embodiments of this application may have two formats. One format is a CAPWAP Message (Vendor Specific (List of 3GPP specific message container)), where the List of 3GPP specific message container may be a target node identifier (Target Node ID)+a message container (message container), and the Target Node ID represents a destination receive end of information in the message container. The Target Node ID may alternatively be an optional information element. For example, if the message does not include the Target Node ID, it indicates that a receive end of information carried in a corresponding message container is a preset target node, for example, a WBAC. The message container carries specific information.

The other format is a CAPWAP Message (Vendor Specific (Forward container, Direct container)), where the Forward container indicates a message that can be directly forwarded by the access controller without parsing, and a format is the same as that of the List of 3GPP specific message container. The Direct container indicates a message that needs to be parsed by the access controller, and a format may be the same as that of the List of 3GPP specific message container, or may be the same as that of the message container.

In an embodiment, the first message may be wireless termination points (WTP) event request message in the CAPWAP protocol. A format of the first message may be a WTP Event Request (V[Target WBAP ID, Relocation Request]). The Target WBAP ID may be an identifier of the access controller. The Relocation Request is used to notify the receive end that the terminal device is ready to be handed over to the target access device, and the Relocation Request may carry the first information.

In another embodiment, the first message may be a Relocation Request. Therefore, the source access device may send the first message to the access controller by using the WTP Event Request (V[Target WBAP ID, Relocation Request]).

In an embodiment, the source access device may determine the target access device based on second information. The second information may include one or more of the following information: a measurement report sent by the terminal device to the source access device, load information of a plurality of access devices, and a mobility management context of the terminal device. The source access device may obtain the load information of the plurality of access devices from the access controller. In an embodiment, the source access device may periodically query the load information of the plurality of access devices from the access controller, or the access controller may periodically push the load information of the plurality of access devices to the source access device. The plurality of access devices may be any plurality of access devices in the communication system, or may be a plurality of adjacent access devices of the source access device, or may be all access devices in the communication system.

Certainly, the source access device may alternatively determine the target access device based on other information. This is not specifically limited in this embodiment of this application.

Operation 402: The access controller sends a second message to the target access device, where the second message includes the multicast service context of the terminal device.

The second message may be used to request to hand over the terminal device to the target access device, and the second message may be the Relocation Request sent by the access controller to the target access device.

In an embodiment, the access controller may determine, based on an actual case, whether the second message needs to carry first multicast tunnel establishment information, where the first multicast tunnel establishment information is used to establish a tunnel for transmitting multicast service data. Specifically, the tunnel is a tunnel established between the target access device and the access controller, and is mainly used by the access controller to transmit data related to the multicast service to the target access device. In an embodiment, the established tunnel may be control and provisioning of wireless access points (CAPWAP) data (DATA) channel information, or may be another protocol, for example, GTP-U tunnel endpoint information. This is not specifically limited in this application. Specifically, the access controller may determine, based on the following cases, whether the first multicast tunnel establishment information needs to be carried.

In an example, when the access controller determines that a protocol of the tunnel that is for transmitting the multicast service data and that is between the access controller and the target access device is GTP-U, the access controller includes the first multicast tunnel establishment information in the second message. In this case, optionally, the first multicast tunnel establishment information may be the GTP-U tunnel endpoint information allocated by the access controller to the multicast service. In this case, the access controller has determined that the target access device does not subscribe to the multicast service currently performed by the terminal device.

In an example, when the access controller determines that a CAPWAP DATA channel or another pre-established channel may be used between the access controller and the target access device to transmit the multicast service data, the access controller does not need to include the first multicast tunnel establishment information in the second message.

In an embodiment, after the target access device receives the second message from the access controller, when determining, based on the multicast service context of the terminal device, that the target access device does not subscribe to the multicast service currently performed by the terminal device, the target access device sends a third message to a multicast source device, where the third message is used to subscribe to the multicast service currently performed by the terminal device. For example, the third message may be an Internet group management protocol (IGMP) join (Join) message sent by the target access device to the multicast source device. In an embodiment, the multicast source device may be but is not limited to a router. It should be noted that all multicast source devices in this application may be routers. This is not limited in this application.

The second message may further carry the first information. The access controller may send the first information to the target access device by using the second message based on the identifier that is of the target access device and that is carried in the first message. Certainly, the second message may further carry other information. This is not listed one by one in this embodiment of this application.

In an embodiment, the second message may be a station configuration request message in the CAPWAP protocol. A format of the second message may be a Station Configuration Request (V[Target WBAP ID, Relocation Request]), and the Target WBAP ID may be the identifier of the target access device.

In another embodiment, the second message may be the Relocation Request. Therefore, the access controller may send the second message to the target access device by using the Station Configuration Request (V [Target WBAP ID, Relocation Request]).

Operation 403: The target access device sends a fourth message to the access controller, where the fourth message is used to respond to the message used to request to hand over the terminal device to the target access device.

The fourth message may be a relocation response (namely, a handover response) sent by the target access device to the access controller.

In an embodiment, the fourth message may include indication information indicating whether to forward the multicast service data. Specifically, when the target access device determines that the target access device has subscribed to the multicast service currently performed by the terminal device, the fourth message may include a multicast group subscribed indication, indicating that the multicast service data does not need to be forwarded.

In an embodiment, the fourth message may further include a forwarding tunnel endpoint identifier of the target access device, so that after the access controller forwards the forwarding tunnel endpoint identifier of the target access device to the source access device, the source access device may directly forward the multicast service data to the target access device based on the forwarding tunnel endpoint identifier of the target access device. The source access device may directly forward the multicast service data to the target access device based on the forwarding tunnel identifier of the target access device, that is, after establishing, based on the forwarding tunnel endpoint identifier of the target access device, a tunnel for forwarding the multicast service data, the source access device forwards the multicast service data to the target access device.

In an embodiment, the fourth message may further include the forwarding tunnel endpoint identifier of the target access device, so that the access controller can forward, to the target access device based on the forwarding tunnel endpoint identifier of the target access device, the multicast service data received from the source access device. Specifically, in this case, the source access device may forward the multicast service data to the target access device through the access controller. When obtaining the forwarding tunnel endpoint identifier of the target access device, the access controller determines, based on the forwarding tunnel endpoint identifier of the target access device, the tunnel that is for forwarding the multicast service data and that is between the access controller and the target access device, so that the access controller forwards the multicast service data to the target access device after receiving the multicast service data forwarded by the source access device.

In an embodiment, when the second message received by the target access device from the access controller includes the first multicast tunnel establishment information, the target access device may further include second multicast tunnel establishment information in the fourth message, where the second multicast tunnel establishment information is used to establish the tunnel for transmitting the multicast service data. In an embodiment, the second multicast tunnel establishment information is multicast tunnel establishment information of the target access device, and is used to establish the tunnel that is for transmitting the multicast service data and that is between the access controller and the target access device. The established tunnel for transmitting the multicast service data is used by the target access device to transmit the data related to the multicast service to the access controller when the target access device performs the multicast service. In this way, the tunnel for transmitting the multicast service data may be established between the target access device and the access controller, and the multicast service data is subsequently transmitted through the tunnel.

Operation 404: The access controller sends a fifth message to the source access device, where the fifth message is used to respond to the message used to request to hand over the terminal device to the target access device, and the fifth message includes the indication information indicating whether to forward the multicast service data.

The fifth message may be a Relocation Response sent by the access controller to the source access device.

In an embodiment, the fifth message includes the indication information indicating whether to forward the multicast service data. Specifically, the following two cases may be included.

Case a1: When the foregoing fourth message includes the indication information indicating whether to forward the multicast service data, the access controller may directly include, in the fifth message, the indication information that indicates whether to forward the multicast service data and that is included in the fourth message.

The indication information indicating whether to forward the multicast service data may be implicit indication information or explicit indication information. Specifically, when the target access device needs to forward the multicast service data, the indication information includes a tunnel endpoint identifier that is allocated by the target access device and that is used to forward the multicast service data. Optionally, the indication information further carries an indication of forwarding the multicast service data, and a value of the indication may be "forwarding the multicast service data" or "not subscribing to the multicast service". This is not limited in this application. When the target access device does not need to forward the multicast service data, the indication information does not carry the tunnel identifier that is allocated by the target access device and that is used to forward the multicast service data. Optionally, the indication information may carry an indication of not forwarding the multicast service data, and a value of the indication may be "not forwarding the multicast service data" or "having subscribed to the multicast service". This is not limited in this application.

Case a2: The access controller includes, in the second message based on whether the target access device subscribes to the multicast service currently performed by the terminal device, the indication information indicating whether to forward the multicast service data. In this case a2, the access controller does not parse whether the fourth message includes the indication information indicating whether to forward the multicast service data, but directly determines whether the target access device subscribes to the multicast service currently performed by the terminal device.

The indication information indicating whether to forward the multicast service data may be implicit indication information or explicit indication information. In an embodiment, when the target access device does not subscribe to the multicast service currently performed by the terminal device, the indication information may not carry any indication, or may carry an indication of forwarding the multicast service data. A value of the indication may be "forwarding the multicast service data" or "not subscribing to the multicast service" or an identifier of the multicast service. This is not limited in the embodiments disclosed herein. When the target access device has subscribed to the multicast service currently performed by the terminal device, the indication information may carry an indication of not forwarding the multicast service data. A value of the indication may be "not forwarding the multicast service data" or "having subscribed to the multicast service data". Optionally, the indication information may further carry an identifier of the multicast service. This is not limited in this application.

In an embodiment, based on different cases of forwarding the multicast service data, the fifth message may further have the following two cases.

Case 1: The fifth message further includes the forwarding tunnel endpoint identifier of the target access device, that is, the forwarding tunnel endpoint identifier that is of the target access device and that is included in the fourth message described in operation 403 is included in the fifth message. In this way, the source access device can directly forward the multicast service data to the target access device subsequently.

Case 2: The fifth message may further include a forwarding tunnel endpoint identifier of the access controller, so that the source access device can send the multicast service data to the access controller based on the forwarding tunnel identifier of the access controller. The source access device may forward the multicast service data to the access controller based on the forwarding tunnel identifier of the access controller, that is, after establishing, based on the forwarding tunnel endpoint identifier of the access controller, a tunnel that is for forwarding the multicast service data and that is between the source access device and the access controller, the source access device forwards the multicast service data to the access controller. In this case, the source access device indirectly forwards the multicast service data to the target access device through the access controller. Specifically, after the source access device forwards the multicast service data to the access controller, the access controller forwards the multicast service data to the target access device (specifically, as described in operation 403, after establishing, based on the forwarding tunnel endpoint identifier that is of the target access device and that is included in the fourth message, the tunnel for forwarding the multicast service data, the access controller forwards the multicast service data).

In an embodiment, after receiving the fifth message, the source access device determines, based on the indication information indicating whether to forward the multicast service data, whether to forward the multicast service data. Specifically, when the indication information indicating whether to forward the multicast service data indicates that the multicast service data needs to be forwarded, the source access device establishes, based on the forwarding tunnel endpoint identifier that is of the target access device and that is included in the fifth message, the tunnel for forwarding the multicast service data, and directly forwards the multicast service data to the target access device through the tunnel for forwarding the multicast service data; or the source access device establishes the tunnel that is for forwarding the multicast service data and that is between the source access device and the access controller based on the forwarding tunnel endpoint identifier that is of the access controller and that is included in the fifth message, and forwards the multicast service data to the access controller through the tunnel that is for forwarding the multicast service data and that is between the source access device and the access controller, so that the access controller subsequently forwards the multicast service data to the target access device. When the indication information indicating whether to forward the multicast service data indicates that the multicast service data does not need to be forwarded, the source access device does not forward the multicast service data regardless of whether the forwarding tunnel endpoint identifier allocated by the target access device or the forwarding tunnel endpoint identifier of the access controller is received.

It should be noted that, in this embodiment of this application, when the source access device directly forwards the multicast service data to the target access device, a tunnel that is for forwarding the multicast service data and that is between the source access device and the target access device may be referred to as a direct forwarding tunnel, and the source access device may directly forward any data related to the multicast service to the target access device through the direct forwarding tunnel. When the source access device forwards multicast service data to the target access device through the access controller, the tunnel that is for forwarding the multicast service data and that is between the source access device and the access controller and the tunnel that is for forwarding the multicast service data and that is between the access controller and the target access device may be referred to as indirect forwarding tunnels. The source access device may indirectly forward any data related to the multicast service to the target access device through the indirect forwarding tunnel through the access controller.

In an embodiment, after receiving the fifth message, the source access device may determine, based on the fifth message, whether the target access device subscribes to the multicast service currently performed by the terminal device.

In an embodiment, when the target access device does not subscribe to the multicast service currently performed by the terminal device, the source access device notifies the terminal device to subscribe to, through the target access device, the multicast service currently performed by the terminal device.

That the source access device determines, based on the fifth message, whether the target access device subscribes to the multicast service currently performed by the terminal device may be specifically classified into the following several cases.

Case b1: When the fifth message includes the identifier of a multicast service currently subscribed to or carried by the target access device, the source access device may determine, based on the identifier of the multicast service currently subscribed to or carried by the target access device, whether the target access device subscribes to the multicast service currently performed by the terminal device.

Case b2: When the fifth message includes information indicating that the target access device does not subscribe to the multicast service currently performed by the terminal device, the source access device determines, based on the information, that the target access device does not subscribe to the multicast service currently performed by the terminal device.

Case b3: When the indication information that indicates whether to forward the multicast service data and that is included in the fifth message indicates to forward the multicast service data, the source access device determines that the target access device does not subscribe to the multicast service currently performed by the terminal device.

In an embodiment, the source access device notifies the terminal device, through the target access device, to subscribe to the multicast service currently performed by the terminal device. A method may be as follows.

The source access device sends a sixth message to the terminal device, where the sixth message includes notification information of subscribing to the multicast service currently performed by the terminal device.

The multicast source device adds the target access device to the multicast service currently performed by the terminal device. Specifically, the terminal device sends a seventh message to the target access device, where the seventh message is used to indicate that the target access device does not subscribe to the multicast service currently performed by the terminal device, or request the target access device to subscribe to the multicast service currently performed by the terminal device.

The target access device sends a nineteenth message to the multicast source device, where the nineteenth message is used to indicate that the multicast source device adds the target access device to the multicast service currently performed by the terminal device.

For example, the sixth message may be a handover command message sent by the source access device to the terminal device. The seventh message may be an IGMP Join message.

In an actual case, a process of forwarding the multicast service data between the source access device and the target access device may be terminated based on different settings. Examples may be as follows.

Example c1: If a data forwarding timer is set in the target access device, when receiving the multicast service data from the source access device, the target access device starts the data forwarding timer; when the data forwarding timer expires, the target access device starts a tunnel deletion timer, and sends an eighth message to the access controller, where the eighth message is used to request to stop transmission of the data; the access controller forwards the eighth message to the source access device, so that the source access device stops forwarding the multicast service data to the target access device, and the source access device deletes the tunnel for forwarding the multicast service data; when the tunnel deletion timer expires, the target access device deletes the tunnel for forwarding the multicast service data.

Example c2: If a data forwarding timer is set in the source access device, when sending the multicast service data to the target access device for the first time, the source access device starts the data forwarding timer; when the data forwarding timer expires, the source access device sends a ninth message to the target access device, and deletes the tunnel for forwarding the multicast service data, where the ninth message is used to indicate that the data has been forwarded; after receiving the ninth message from the source access device, the target access device deletes the tunnel for forwarding the multicast service data.

Example c3: If a data forwarding timer is set in the source access device, when sending the multicast service data to the target access device for the first time, the source access device starts the data forwarding timer; when the data forwarding timer expires, the source access device sends a tenth message to the target access device through the access controller, and deletes the tunnel for forwarding the multicast service data, where the tenth message is used to indicate that the data has been forwarded; the access controller forwards the tenth message to the target access device, and after receiving the tenth message, the target access device deletes the tunnel for forwarding the multicast service data.

Example c4: If two data forwarding timers are set in the target access device and the source access device respectively, when sending the multicast service data to the target access device for the first time, the source access device starts the set data forwarding timer; when receiving the multicast service data from the source access device, the target access device starts the set data forwarding timer; when the respective data forwarding timers set in the target access device and the source access device expire, the target access device and the source access device respectively delete their own tunnels for transmitting the multicast service data.

According to the communication method provided in the embodiments of this application, in a process in which the terminal device is handed over between the access devices, a handover procedure can be flexibly performed, and multicast service continuity can be ensured without requiring a fixed anchor to participate in the handover of the terminal device. In this way, a resource waste caused by deployment of the fixed anchor can be avoided.

Based on the foregoing embodiments, the communication method provided in the embodiments of this application is described in detail by using examples, for example, embodiments shown in FIG. 5 to FIG. 10B below. In the following examples, an example in which a terminal device is WBCPE, an access controller is a WBAC, and an access device is a WBAP (where a source access device is an S WBAP, and a target access device is a T WBAP) is used for description. When a multicast source device is involved, an example in which the multicast source device is a router is used for description.

Figure 5:
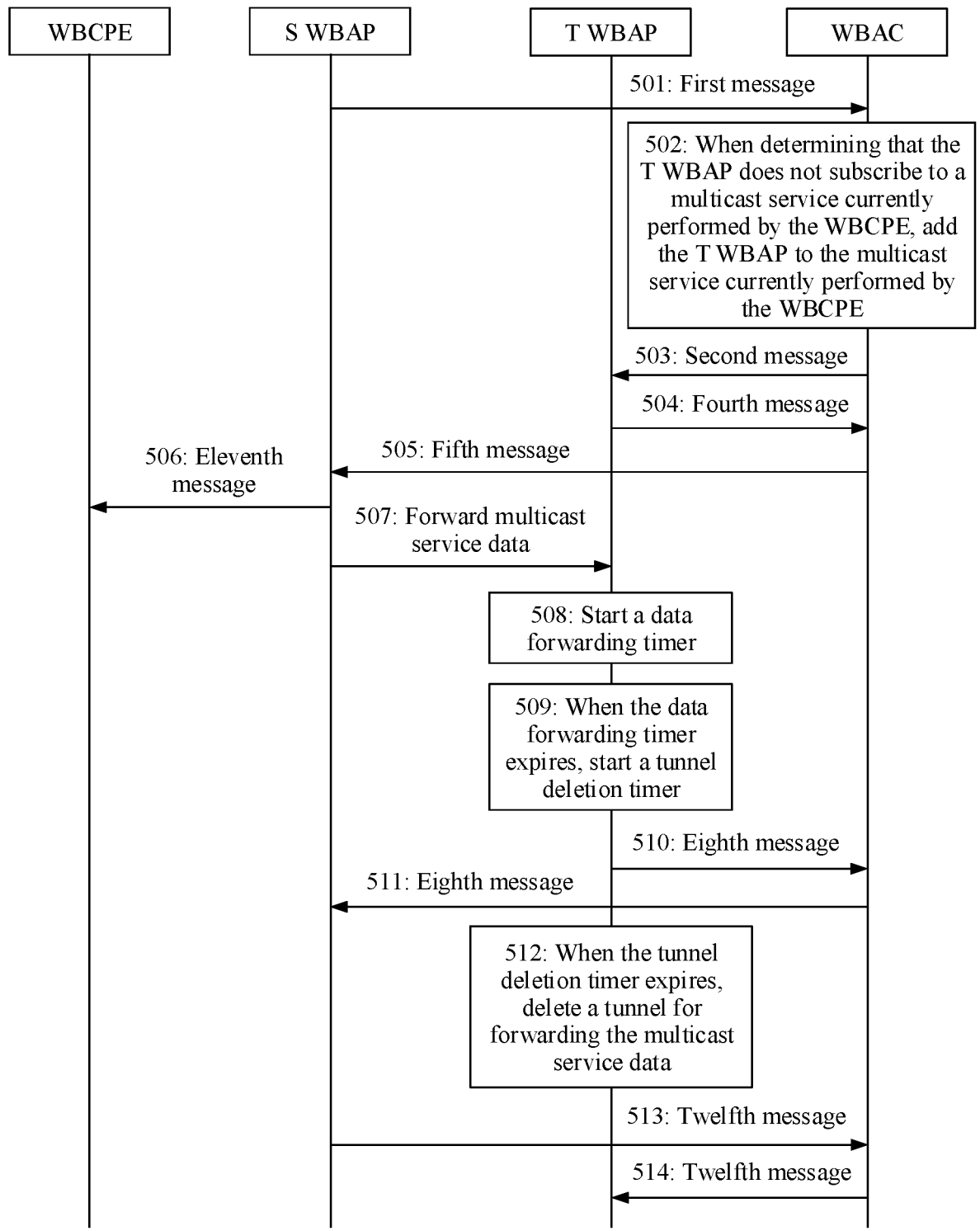
FIG. 5 is a flowchart of an example of a communication method according to this application.

Based on the foregoing embodiments, as shown in FIG. 5, an embodiment of this application further provides an example of the communication method. This example may be applied to the multicast architecture shown in FIG. 2. Specifically, a procedure of the example may include the following operations.

Operation 501: The S WBAP sends a first message to the WBAC, where the first message is used to request to hand over the WBCPE to the T WBAP, and the first message includes a multicast service context of the WBCPE.

Operation 502: The WBAC determines, based on the multicast service context of the WBCPE, whether the T WBAP subscribes to a multicast service currently performed by the WBCPE. When determining that the T WBAP does not subscribe to the multicast service currently performed by the WBCPE, the WBAC adds the T WBAP to the multicast service currently performed by the WBCPE.

Specifically, in an embodiment, that the WBAC adds the T WBAP to the multicast service currently performed by the WBCPE means that the WBAC adds the T WBAP to a multicast group of the multicast service currently performed by the WBCPE, that is, subsequently, the WBAC sends multicast service data (namely, a data packet of the multicast service) to the T WBAP. In a subsequent process, according to the embodiment shown in FIG. 4, after a tunnel for transmitting the multicast service data is established between the access controller and the target access device by using first multicast tunnel establishment information, and a tunnel for transmitting the multicast service data is established between the target access device and the access controller by using second multicast tunnel establishment information, the multicast service data is transmitted between the WBAC and the T WBAP.

Operation 503: The WBAC sends a second message to the T WBAP, where the second message is used to request to hand over the WBCPE to the T WBAP, and the second message includes the multicast service context of the WBCPE.

Operation 504: The T WBAP sends a fourth message to the WBAC, where the fourth message is used to respond to the message used to request to hand over the WBCPE to the WBAP.

Operation 505: The WBAC sends a fifth message to the S WBAP, where the fifth message is used to respond to the message used to request to hand over the WBCPE to the WBAP, and the fifth message includes indication information indicating whether to forward the multicast service data.

It should be noted that all subsequent operations are performed in a case in which the indication information indicates to forward the multicast service data.

Operation 506: The S WBAP sends an eleventh message to the WBCPE, where the eleventh message is used to indicate the WBCPE to perform a handover procedure.

The eleventh message may be a handover command (Handover Command) message sent by the S WBAP to the WBCPE.

Operation 507: The S WBAP forwards the multicast service data to the T WBAP.

Operation 508: The T WBAP starts a data forwarding timer.

Operation 509: When the data forwarding timer expires, the T WBAP starts a tunnel deletion timer.

Operation 510: The T WBAP sends an eighth message to the WBAC, where the eighth message is used to request to stop transmission of the data.

Specifically, the eighth message may be a stop data forwarding request sent by the T WBAP to the WBAC.

Operation 511: The WBAC forwards the eighth message to the S WBAP.

Operation 512: When the tunnel deletion timer expires, the T WBAP deletes a tunnel for forwarding the multicast service data.

Operation 513: The S WBAP sends a twelfth message to the WBAC, and deletes the tunnel for forwarding the multicast service data, where the twelfth message is used to respond to the stop data forwarding request of the eighth message.

The twelfth message may be a stop data forwarding response.

Operation 514: The WBAC forwards the twelfth message to the T WBAP.

It should be noted that the operations of sending the twelfth message in operation 513 and operation 514 are optional operations. This is not limited in this application.

Based on the foregoing example, in a process in which the WBCPE is handed over between the access devices, a handover procedure can be flexibly performed, and multicast service continuity can be ensured without requiring a fixed anchor to participate in the handover of the WBCPE. In this way, a resource waste caused by deployment of the fixed anchor can be avoided.

Figure 6A:
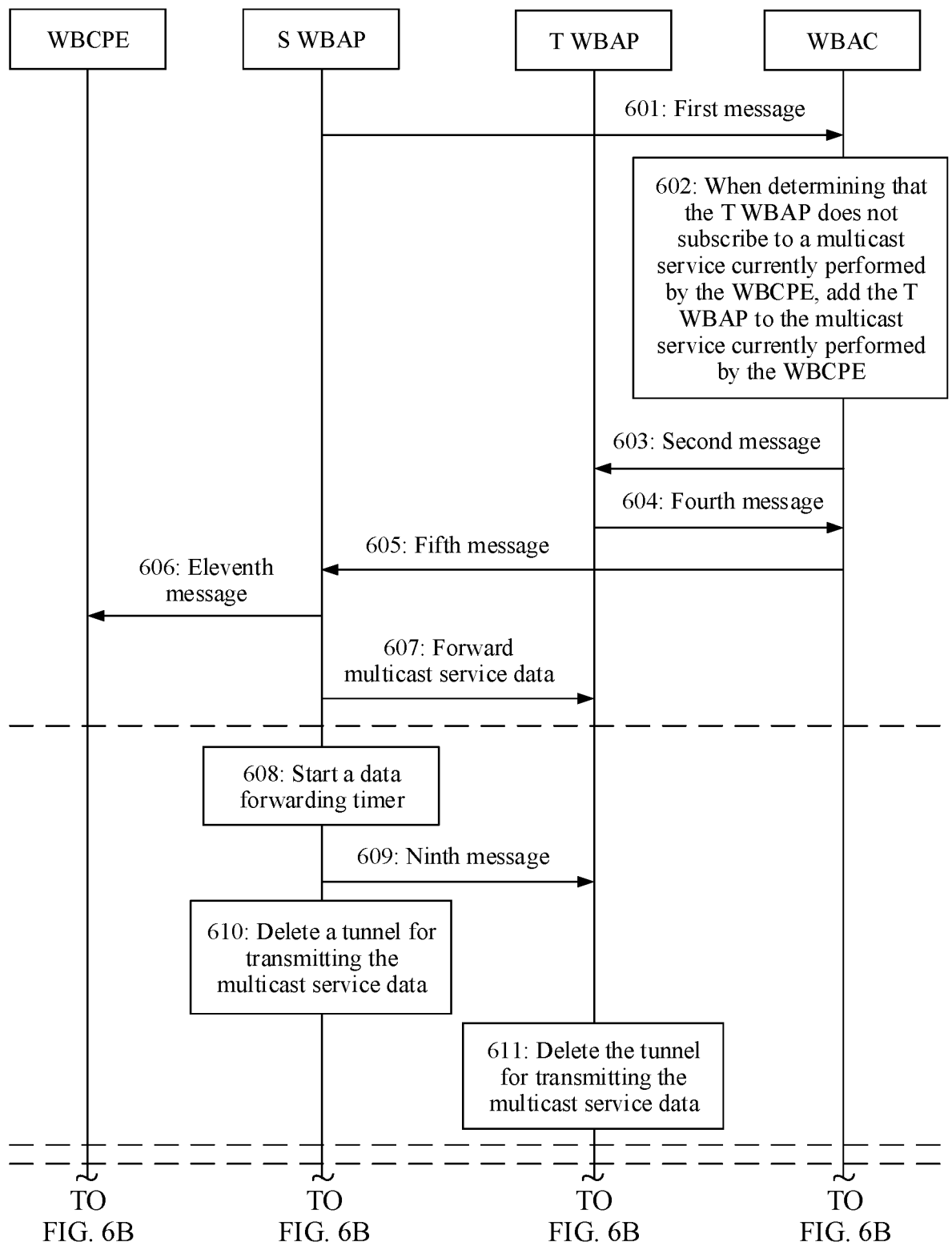
FIG. 6A and FIG. 6B are another flowchart of an example of a communication method according to this application.
Figure 6B:
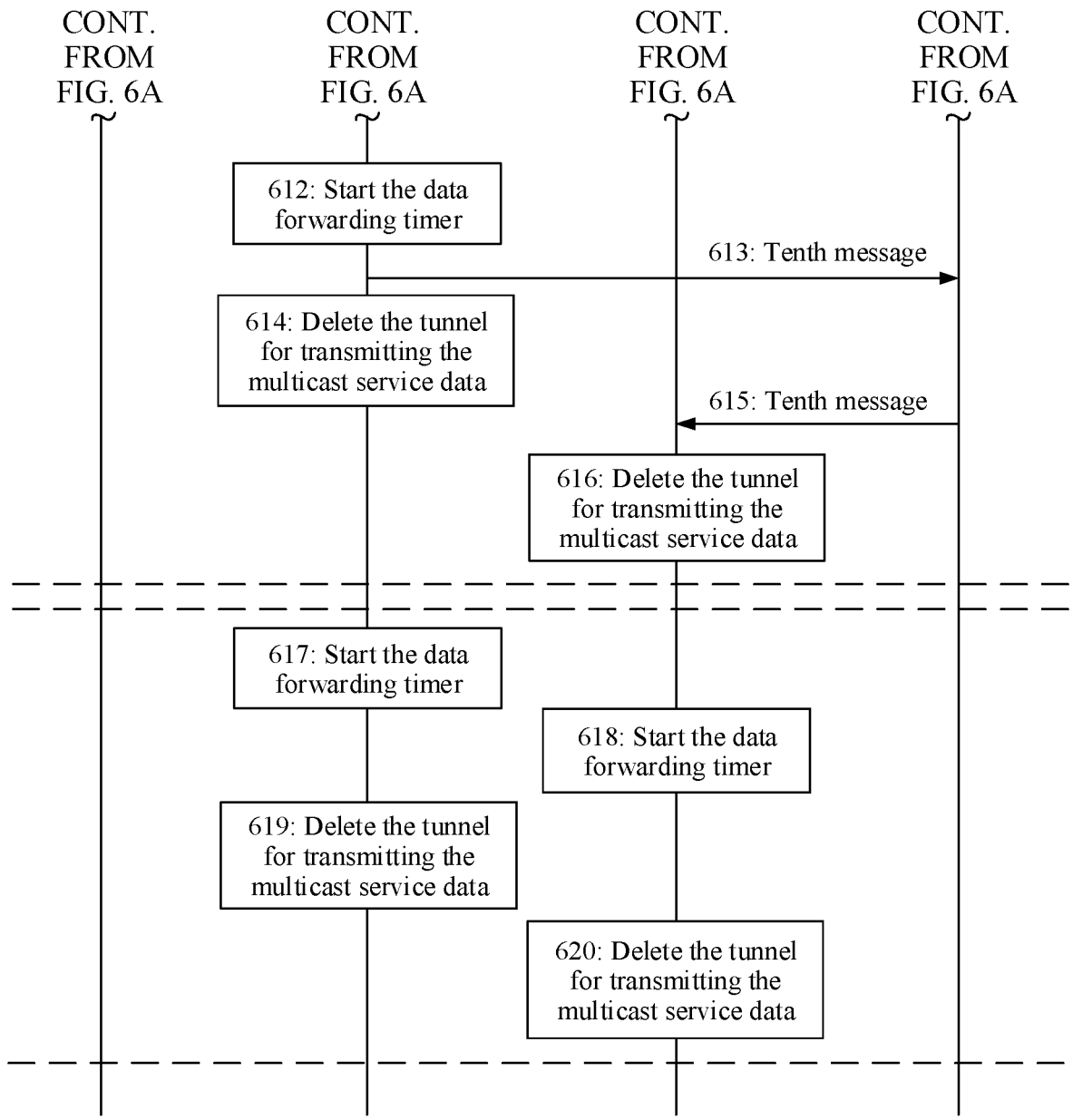

Based on the foregoing embodiments, as shown in FIG. 6A and FIG. 6B, an embodiment of this application further provides an example of the communication method. This example may be applied to the multicast architecture shown in FIG. 2. Specifically, a procedure of the example may include the following operations.

Operation 601 to operation 607 are similar to operation 501 to operation 507 in the embodiment shown in FIG. 5. For details, mutual reference may be made. Details are not described herein again.

In a possible example, when a data forwarding timer is set in the S WBAP, the following operation 608 to operation 610 may be performed.

Operation 608: The S WBAP starts the data forwarding timer.

Operation 609: When the data forwarding timer expires, the S WBAP sends a ninth message to the T WBAP, where the ninth message is used to indicate that the data has been forwarded.

The ninth message may exist in a form of an end marker packet generated by the S WBAP.

Operation 610: The S WBAP deletes a tunnel for forwarding the multicast service data.

Operation 611: The T WBAP deletes the tunnel for forwarding the multicast service data.

In another possible example, when a data forwarding timer is set in the S WBAP, the following operation 612 to operation 616 may be performed.

Operation 612: The S WBAP starts the data forwarding timer.

Operation 613: When the data forwarding timer expires, the S WBAP sends a tenth message to the WBAC, where the tenth message is used to indicate that the data has been forwarded.

The tenth message may exist in a form of an end marker packet generated by the S WBAP, or may be a control plane message.

Operation 614: The S WBAP deletes a tunnel for forwarding the multicast service data.

Operation 615: The WBAC forwards the tenth message to the T WBAP.

Operation 616: The T WBAP deletes the tunnel for forwarding the multicast service data.

In another possible example, when two data forwarding timers are respectively set in the T WBAP and the S WBAP, the following operation 617 to operation 620 may be performed.

Operation 617: The S WBAP starts the data forwarding timer.

Operation 618: The T WBAP starts the data forwarding timer.

Operation 619: When the data forwarding timer set in the S WBAP expires, the S WBAP deletes a tunnel for forwarding the multicast service data.

Operation 620: When the data forwarding timer set in the T WBAP expires, the T WBAP deletes the tunnel for forwarding the multicast service data.

Based on the foregoing examples, in a process in which the WBCPE is handed over between the access devices, a handover procedure can be flexibly performed, and multicast service continuity can be ensured without requiring a fixed anchor to participate in the handover of the WBCPE. In this way, a resource waste caused by deployment of the fixed anchor can be avoided.

Figure 7:
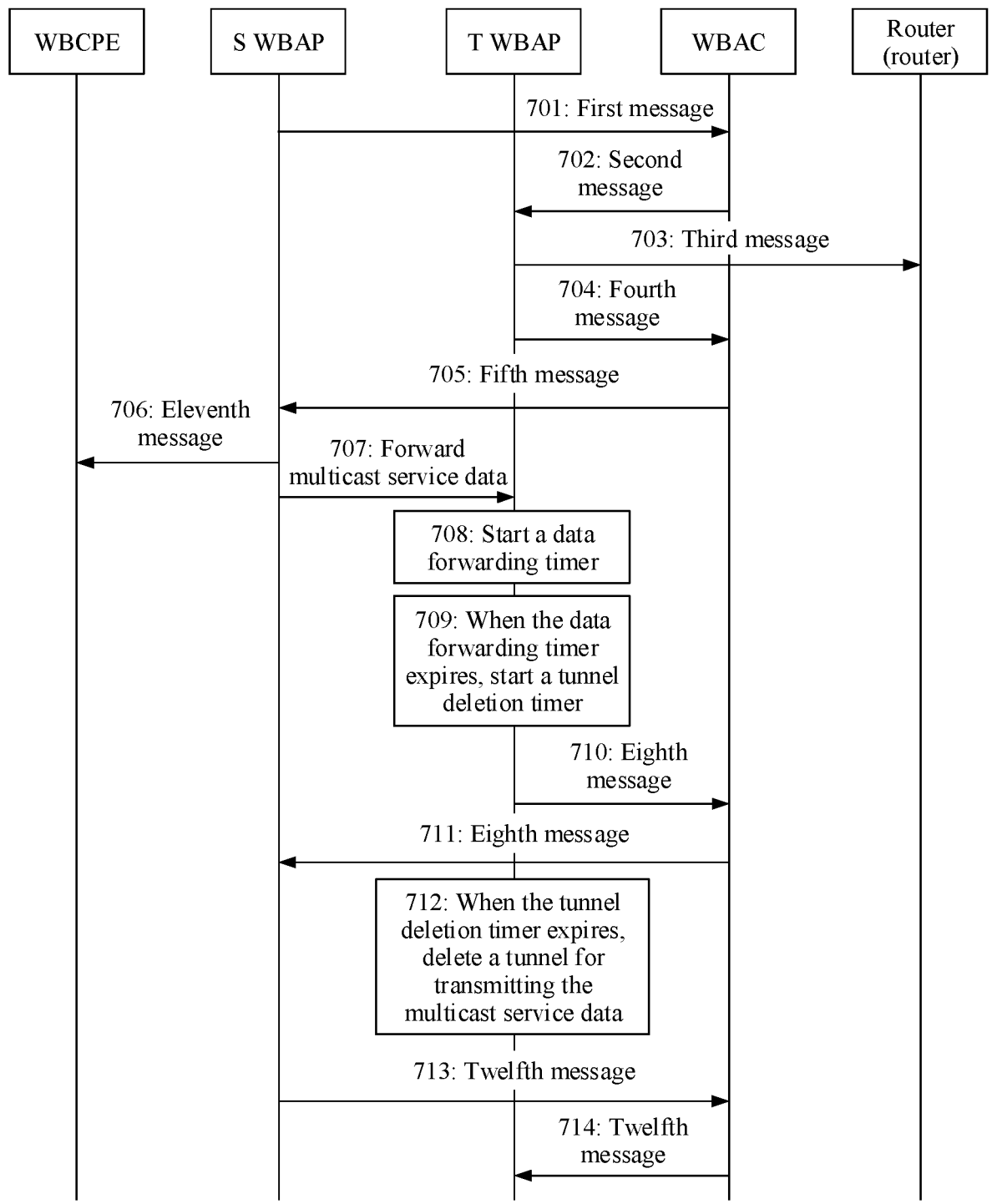
FIG. 7 is another flowchart of an example of a communication method according to this application.

Based on the foregoing embodiments, as shown in FIG. 7, an embodiment of this application further provides an example of the communication method. This example may be applied to the multicast architecture shown in FIG. 3. Specifically, a procedure of the example may include the following operations.

Operation 701 is similar to operation 501 in the embodiment shown in FIG. 5. For details, mutual reference may be made. Details are not described herein again.

Operation 702 is similar to operation 503 in the embodiment shown in FIG. 5. For details, mutual reference may be made. Details are not described herein again.

Operation 703: When determining, based on the multicast service context of the WBCPE, that the T WBAP does not subscribe to a multicast service currently performed by the WBCPE, the T WBAP sends a third message to a router, where the third message is used to subscribe to the multicast service currently performed by the WBCPE.

After receiving the third message, the router adds the T WBAP to the multicast service currently performed by the WBCPE.

Operation 704 to operation 714 are similar to operation 504 to operation 514 in the embodiment shown in FIG. 5. For details, mutual reference may be made. Details are not described herein again.

Figure 8A:
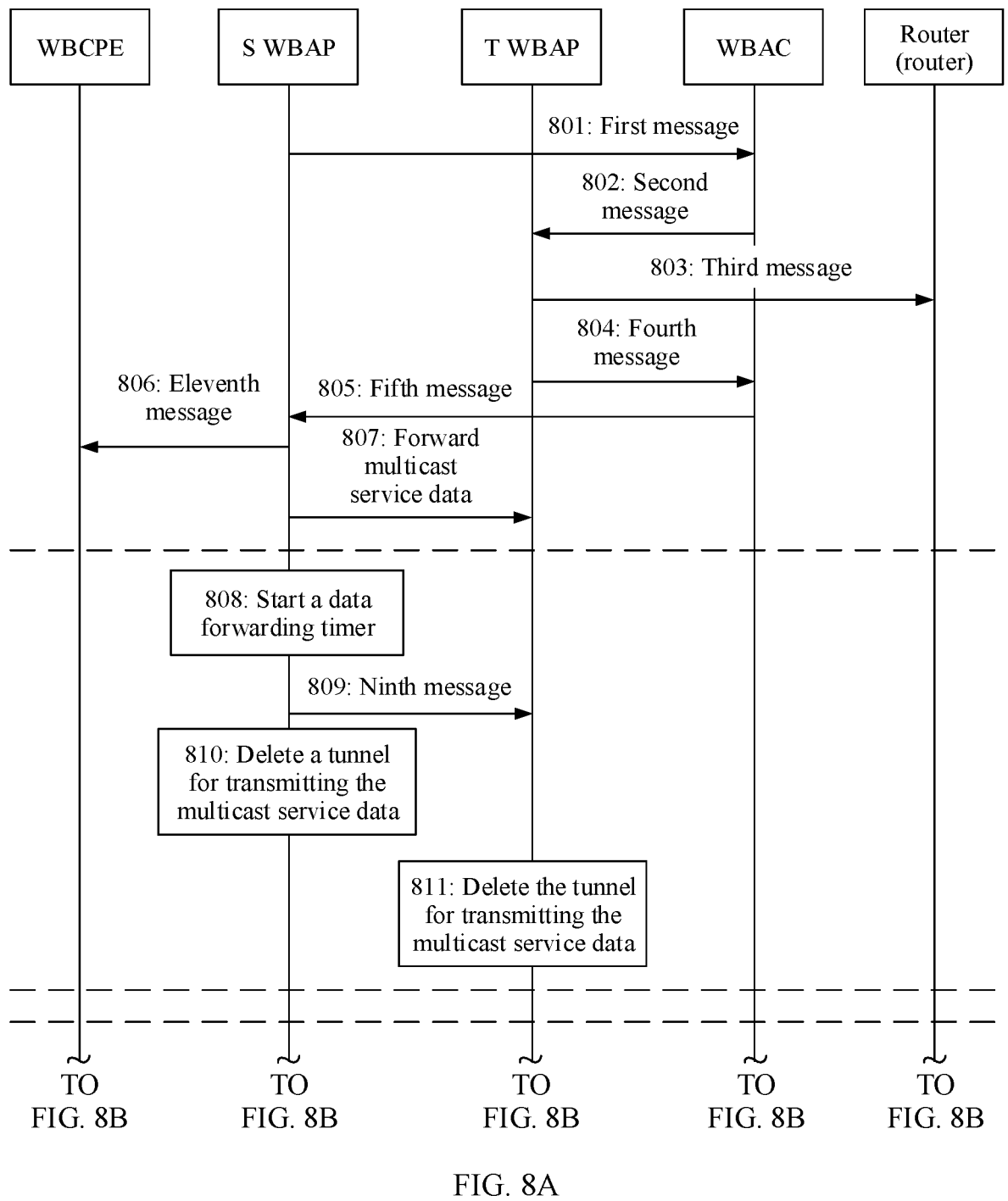
FIG. 8A and FIG. 8B are another flowchart of an example of a communication method according to this application.
Figure 8B:
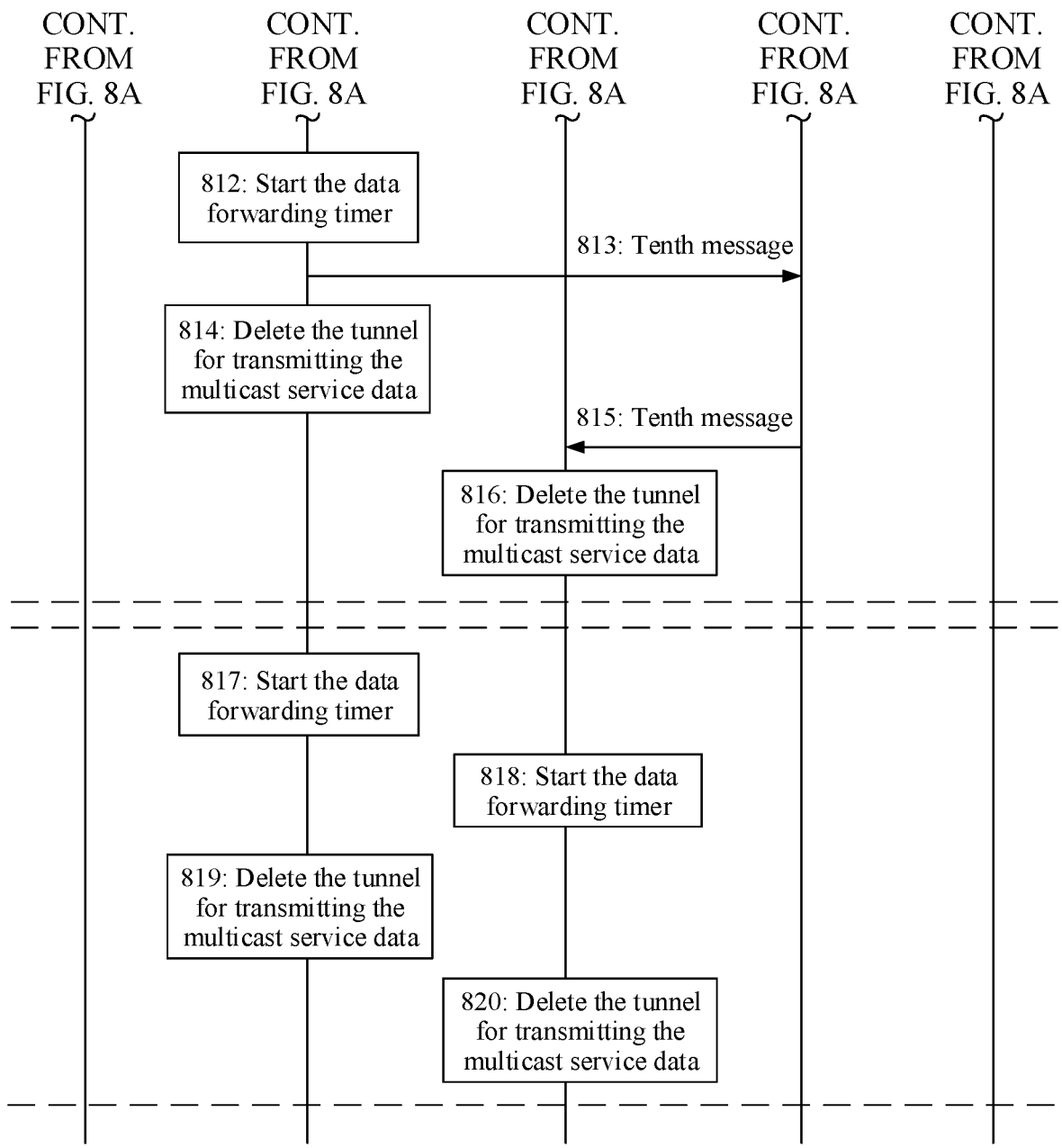

Based on the foregoing embodiments, as shown in FIG. 8A and FIG. 8B, an embodiment of this application further provides an example of the communication method. This example may be applied to the multicast architecture shown in FIG. 3. Specifically, a procedure of the example may include the following operations.

Operation 801 is similar to operation 601 in the embodiment shown in FIG. 6A and FIG. 6B. For details, mutual reference may be made. Details are not described herein again.

Operation 802 is similar to operation 603 in the embodiment shown in FIG. 6A and FIG. 6B. For details, mutual reference may be made. Details are not described herein again.

Operation 803: When determining, based on the multicast service context of the WBCPE, that the T WBAP does not subscribe to a multicast service currently performed by the WBCPE, the T WBAP sends a third message to a router, where the third message is used to subscribe to the multicast service currently performed by the WBCPE.

After receiving the third message, the router adds the T WBAP to the multicast service currently performed by the WBCPE.

Operation 804 to operation 820 are similar to operation 604 to operation 620 in the embodiment shown in FIG. 6A and FIG. 6B. For details, mutual reference may be made. Details are not described herein again.

Figure 9:
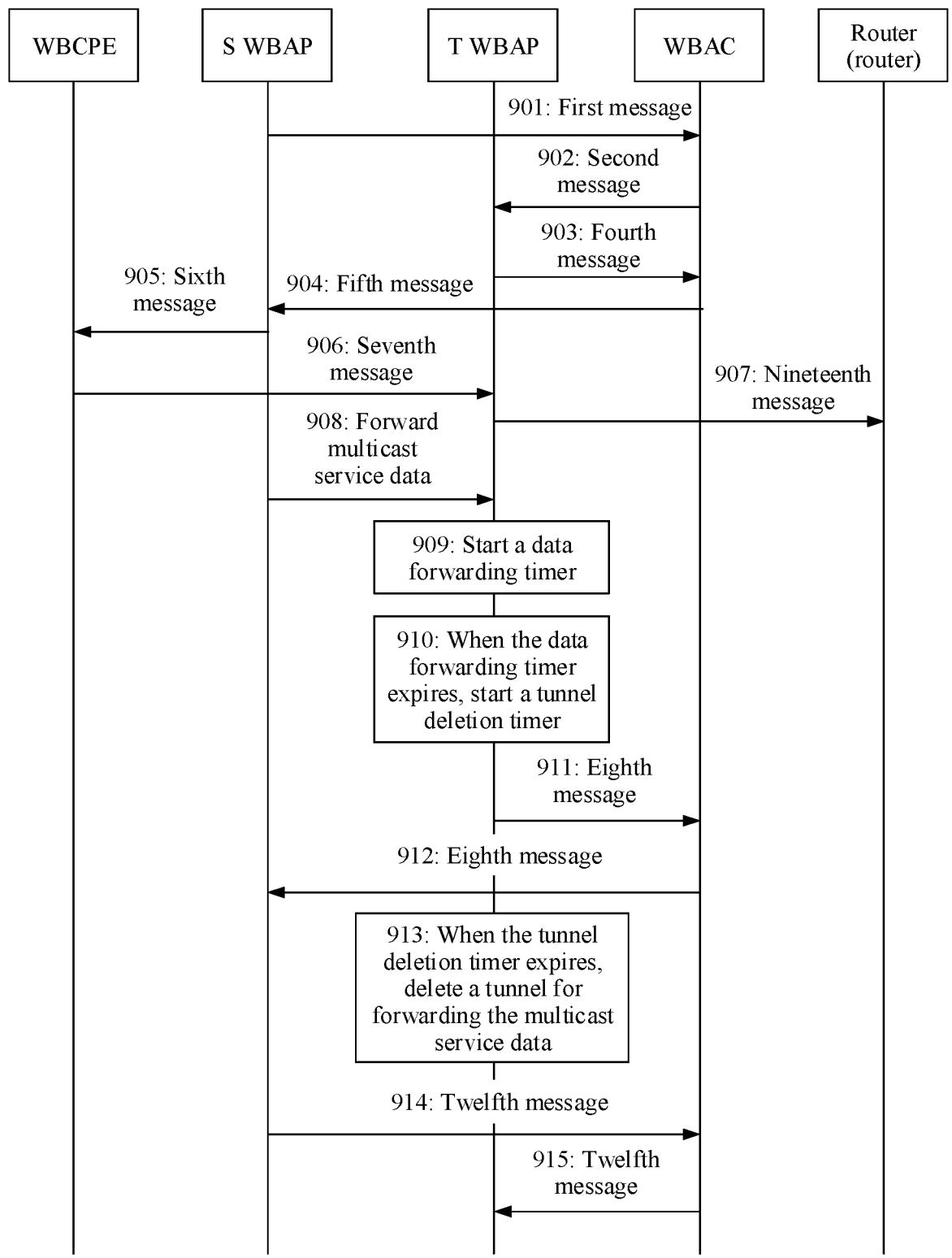
FIG. 9 is another flowchart of an example of a communication method according to this application.

Based on the foregoing embodiments, as shown in FIG. 9, an embodiment of this application further provides an example of the communication method. This example may be applied to the multicast architecture shown in FIG. 3. Specifically, a procedure of the example may include the following operations.

Operation 901 and operation 902 are similar to operation 701 and operation 702 in the embodiment shown in FIG. 7. For details, mutual reference may be made. Details are not described herein again.

Operation 903 and operation 904 are similar to operation 704 and operation 705 in the embodiment shown in FIG. 7. For details, mutual reference may be made. Details are not described herein again.

Operation 905: The S WBAP determines that the T WBAP does not subscribe to a multicast service currently performed by the WBCPE, and the S WBAP sends a sixth message to the WBCPE, where the sixth message includes notification information of subscribing to the multicast service currently performed by the WBCPE.

For details of the determining, by the S WBAP, that the T WBAP does not subscribe to a multicast service currently performed by the WBCPE, refer to the related descriptions of operation 404 in which the source access device determines, based on the fifth message, that the target access device does not subscribe to the multicast service currently performed by the terminal device in the embodiment shown in FIG. 4. Details are not described herein again.

The sixth message is used to indicate the WBCPE to perform a handover procedure, and may be a handover command sent by the S WBAP to the WBCPE.

Operation 906: When determining that the T WBAP does not subscribe to the multicast service currently performed by the WBCPE, the WBCPE sends a seventh message to the T WBAP, where the seventh message is used to indicate that the T WBAP does not subscribe to the multicast service currently performed by the WBCPE, or request the T WAAP to subscribe to the multicast service currently performed by the WBCPE.

Operation 907: The T WBAP sends a nineteenth message to a router, where the nineteenth message is used to indicate the router to add the T WBAP to the multicast service currently performed by the WBCPE.

Operation 908 to operation 915 are similar to operation 707 to operation 714 in the embodiment shown in FIG. 7. For details, mutual reference may be made. Details are not described herein again.

Figure 10A:
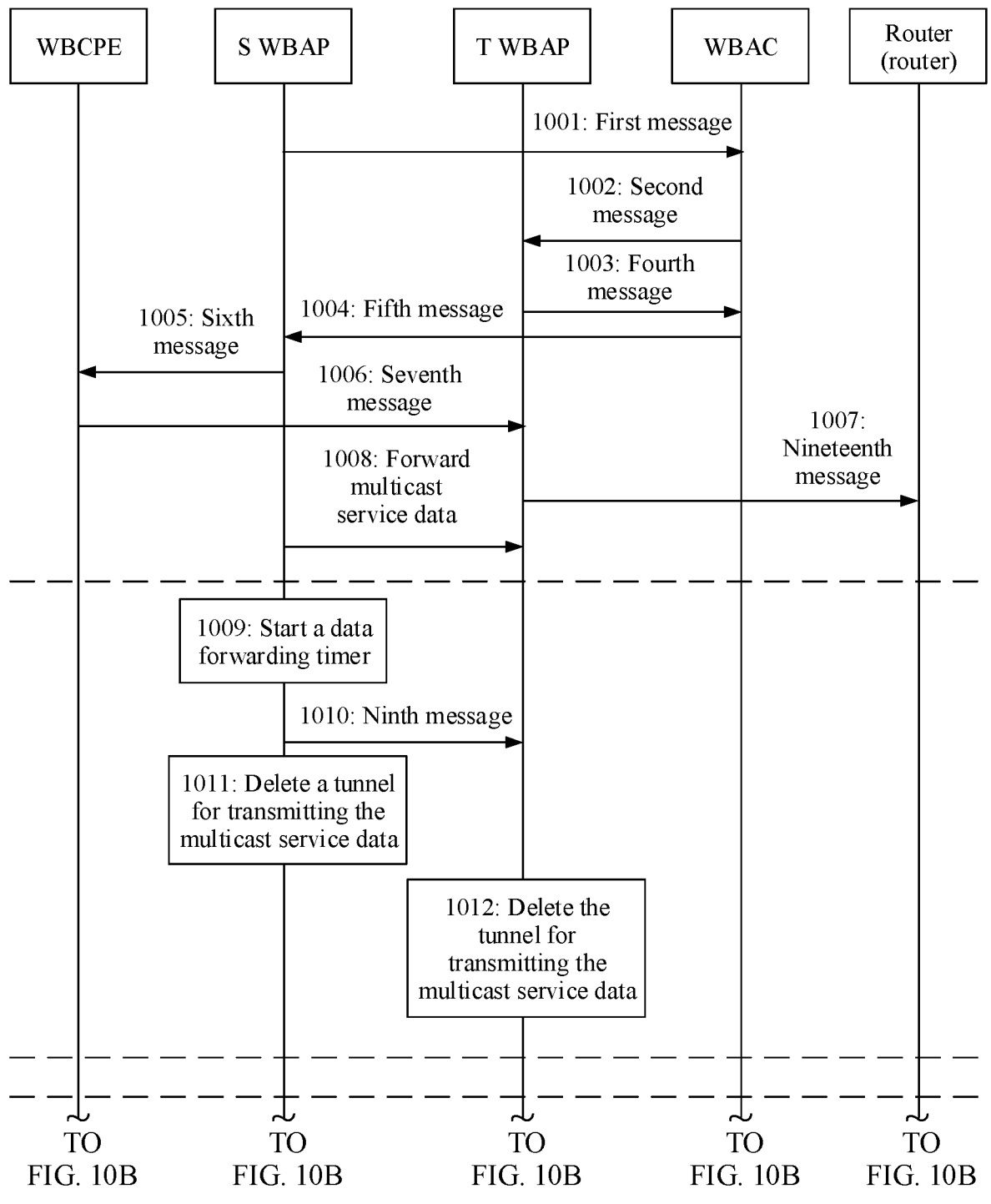
FIG. 10A and FIG. 10B are another flowchart of an example of a communication method according to this application.
Figure 10B:
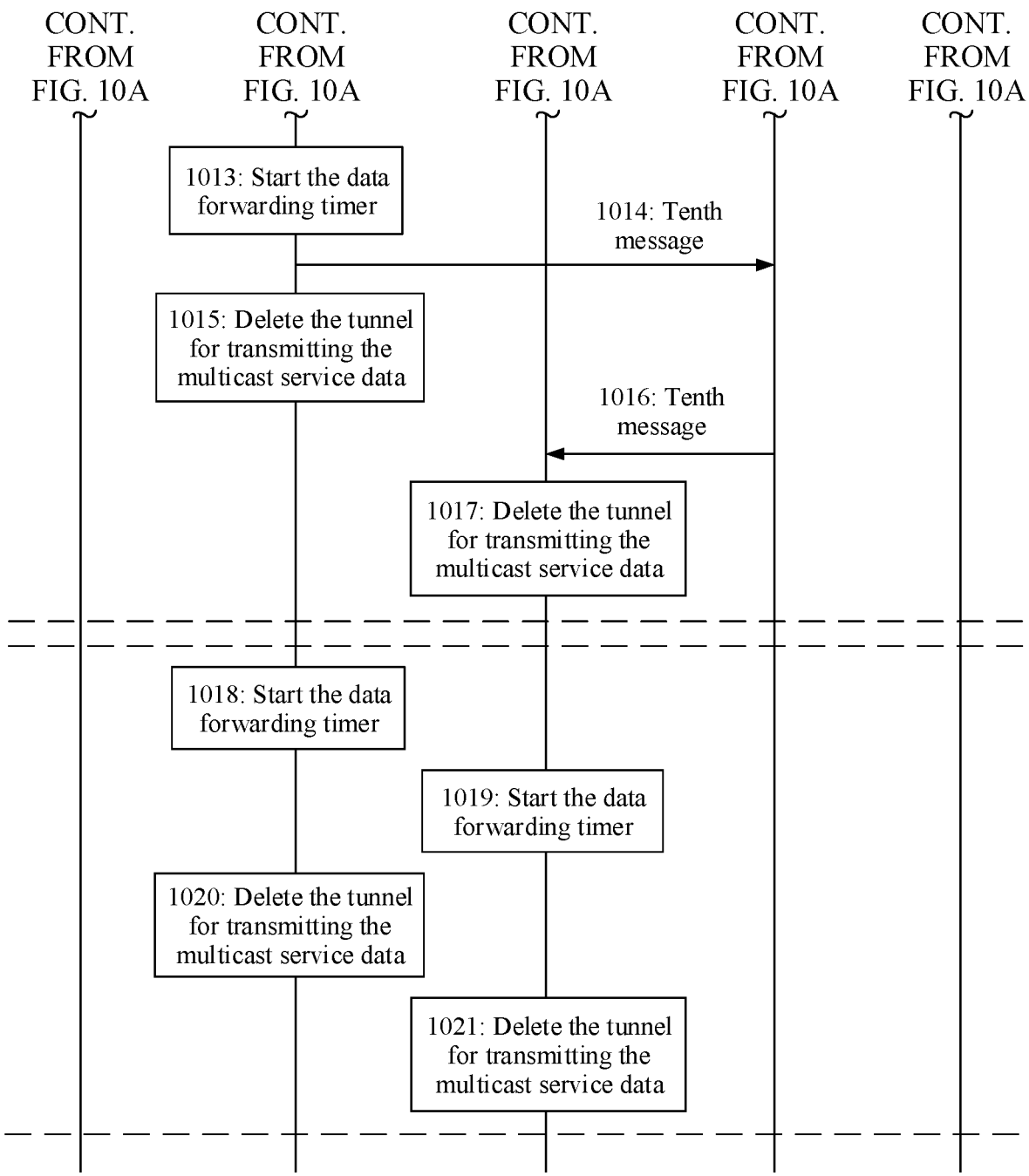

Based on the foregoing embodiments, as shown in FIG. 10A and FIG. 10B, an embodiment of this application further provides an example of the communication method. This example may be applied to the multicast architecture shown in FIG. 3. Specifically, a procedure of the example may include the following operations.

Operation 1001 and operation 1002 are similar to operation 801 and operation 802 in the embodiment shown in FIG. 8A and FIG. 8B. For details, mutual reference may be made. Details are not described herein again.

Operation 1003 and operation 1004 are similar to operation 804 and operation 805 in the embodiment shown in FIG. 8A and FIG. 8B. For details, mutual reference may be made. Details are not described herein again.

Operation 1005: The S WBAP determines that the T WBAP does not subscribe to a multicast service currently performed by the WBCPE, and the S WBAP sends a sixth message to the WBCPE, where the sixth message includes notification information of subscribing to the multicast service currently performed by the WBCPE.

The sixth message is used to indicate the WBCPE to perform a handover procedure, and may be a handover command sent by the S WBAP to the WBCPE.

Operation 1006: When determining that the T WBAP does not subscribe to the multicast service currently performed by the WBCPE, the WBCPE sends a seventh message to the T WBAP, where the seventh message is used to indicate that the T WAAP does not subscribe to the multicast service currently performed by the WBCPE, or request the T WAAP to subscribe to the multicast service currently performed by the WBCPE.

Operation 1007: The T WBAP sends a nineteenth message to a router, where the nineteenth message is used to indicate the router to add the T WBAP to the multicast service currently performed by the WBCPE.

Operation 1008 to operation 1021 are similar to operation 807 to operation 820 in the embodiment shown in FIG. 8A and FIG. 8B. For details, mutual reference may be made. Details are not described herein again.

It should be noted that for descriptions of the operations in the examples shown in FIG. 4 to FIG. 10B, refer to corresponding descriptions of FIG. 4. Details are not described again in the foregoing examples.

Before the methods in the embodiments shown in FIG. 4 to FIG. 10B are implemented, multicast service information needs to be configured, and the multicast service needs to be established. Then, in a process of performing the multicast service, the procedure in which the terminal device is handed over between the access devices is performed. The following describes a multicast service information configuration process by using an embodiment shown in FIG. 11, and describes a multicast service establishment process by using an embodiment shown in FIG. 12.

Figure 11:
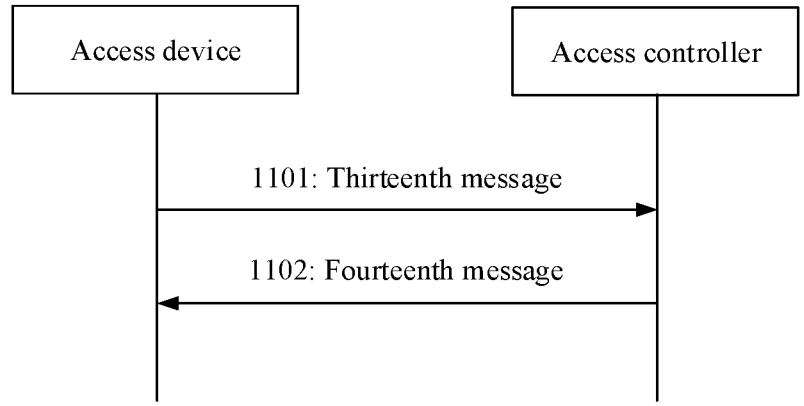
FIG. 11 is a flowchart of a multicast service information configuration method according to this application.

As shown in FIG. 11, an embodiment of this application provides a multicast service information configuration method, to describe a negotiation process of a protocol of a tunnel that is for transmitting multicast service data and that is between an access device and an access controller. Specifically, a procedure of the method may include the following operations.

Operation 1101: The access device sends a thirteenth message to the access controller, where the thirteenth message includes the protocol that is of the tunnel for transmitting the multicast service data and that is supported by the access device.

Specifically, the thirteenth message may be a join request message sent by the access device to the access controller.

The protocol that is of the tunnel for transmitting the multicast service data and that is supported by the access device may be CAPWAP Data, GTP-U, or another protocol type.

In an embodiment, when the protocol that is of the tunnel for transmitting the multicast service data and that is supported by the access device is the GTP-U, the thirteenth message further includes a tunnel endpoint identifier of the access device, for example, a GTP-U tunnel endpoint identifier.

Operation 1102: The access controller sends a fourteenth message to the access device, where the fourteenth message is used to respond to the thirteenth message, and the fourteenth message includes a protocol that is of the tunnel for transmitting the multicast service data and that is supported by the access controller.

Specifically, the fourteenth message may be a join response message sent by the access controller to the access device.

The protocol that is of the tunnel for transmitting the multicast service data and that is supported by the access controller may be CAPWAP Data, GTP-U, or another protocol type.

In an embodiment, when the protocol that is of the tunnel for transmitting the multicast service data and that is supported by the access controller is the GTP-U, the fourteenth message further includes a tunnel endpoint identifier of the access controller, for example, a GTP-U tunnel endpoint identifier.

According to the multicast service information configuration method provided in this embodiment of this application, the protocol of the tunnel that is for transmitting the multicast service data and that is between the access device and the access controller can be negotiated, so that the tunnel for transmitting the multicast service data can be subsequently established.

Figure 12:
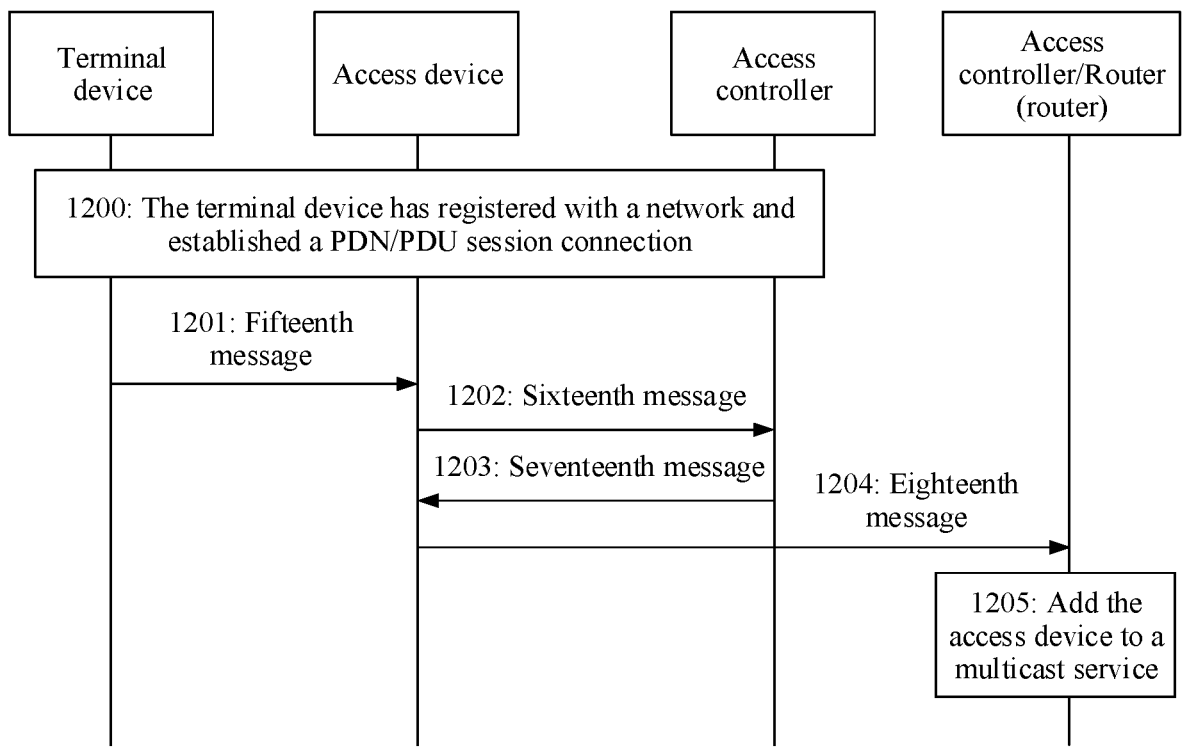
FIG. 12 is a flowchart of a multicast service establishment method according to this application.

As shown in FIG. 12, an embodiment of this application provides a multicast service establishment method. Specifically, a procedure of the method may include the following operations.

Operation 1200: A terminal device has registered with a network and established a PDN/PDU session connection.

Operation 1201: The terminal device sends a fifteenth message to an access device, where the fifteenth message is used to request to establish a multicast service, and the fifteenth message includes an address of the multicast service and an identifier of the terminal device.

Operation 1202: The access device sends a sixteenth message to an access controller, where the sixteenth message is used to request to establish the multicast service, and the sixteenth message includes the identifier of the terminal device and the address of the multicast service.

In an embodiment, the sixteenth message further includes third multicast tunnel establishment information, where the third multicast tunnel establishment information is used to establish a tunnel for transmitting multicast service data. For example, the third multicast tunnel establishment information may be a tunnel endpoint identifier of the multicast service.

Operation 1203: The access controller sends a seventeenth message to the access device, where the seventeenth message is used to indicate that the terminal device is allowed to establish the multicast service, and the seventeenth message includes the identifier of the terminal device and the address of the multicast service.

Specifically, if the access controller determines, based on subscription information, configuration information, and the like of the terminal device, that the terminal device can use the multicast service, the access controller sends the seventeenth message.

The seventeenth message may be a WTP Event Response message.

In an embodiment, the seventeenth message further includes fourth multicast tunnel establishment information, where the fourth multicast tunnel establishment information is used to establish the tunnel for transmitting the multicast service data. For example, the fourth multicast tunnel establishment information may be the tunnel endpoint identifier of the multicast service.

Operation 1204: When determining that the access device does not subscribe to the multicast service, the access device sends an eighteenth message to the access controller or a multicast source device, where the eighteenth message is used to subscribe to the multicast service.

Operation 1205: The access controller or the multicast source device adds the access device to the multicast service.

It should be noted that operation 1204 and operation 1205 are optional operations. In an embodiment, in operation 1203, when determining that the access device does not subscribe to the multicast service, the access controller may add the access device to the multicast service.

According to the multicast service establishment method provided in this embodiment of this application, the multicast service can be established, so that the terminal device subsequently performs the required multicast service.

Figure 13:
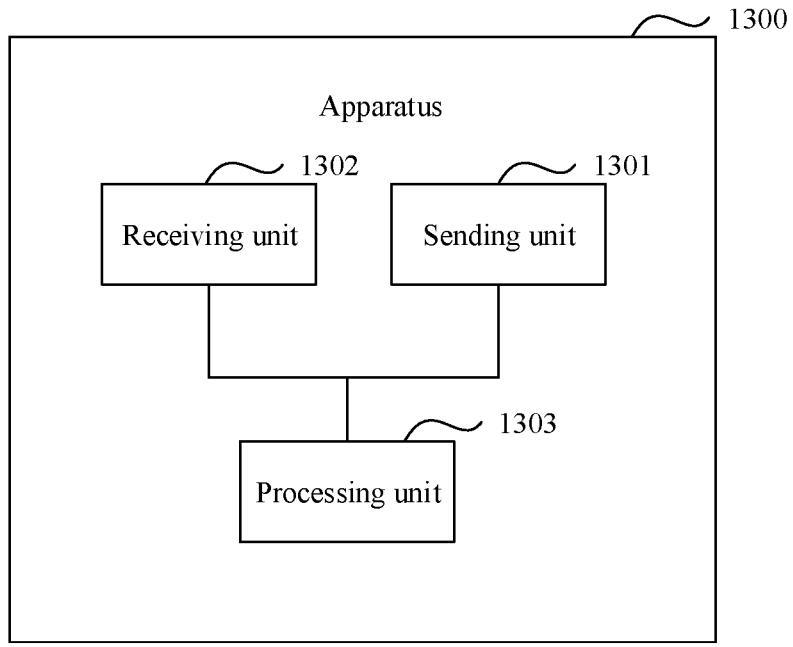
FIG. 13 is a schematic diagram of a structure of an apparatus according to this application.

Based on a same inventive concept as the method embodiments, an embodiment of this application further provides an apparatus 1300. The apparatus is used in a source access device. The apparatus 1300 may be specifically a processor, a chip, a chip system, a function module, or the like in the source access device. Referring to FIG. 13, the apparatus 1300 may include a sending unit 1301, a receiving unit 1302, and a processing unit 1303. The sending unit 1301 is used by the apparatus 1300 to send information, the receiving unit 1302 is used by the apparatus 1300 to receive information, and the processing unit 1303 is configured to control and manage actions of the apparatus 1300. The processing unit 1303 may be further configured to indicate a processing process related to the source access device (for example, an S WBAP) in any one of the foregoing embodiments and/or another process in the technical solutions described in this application. Specifically, the processing unit 1303 may control operations performed by the sending unit 1301 and the receiving unit 1302. For details, refer to the foregoing embodiments. Repeated parts are not described in detail herein again.

When being implemented by hardware, the processing unit 1303 may be a processor, a processing circuit, or the like; the sending unit 1301 may be a transmitter, a transmitter circuit, or the like; the receiving unit 1302 may be a receiver, a receiver circuit, or the like. The sending unit 1301 and the receiving unit 1302 may constitute a transceiver.

Figure 14:
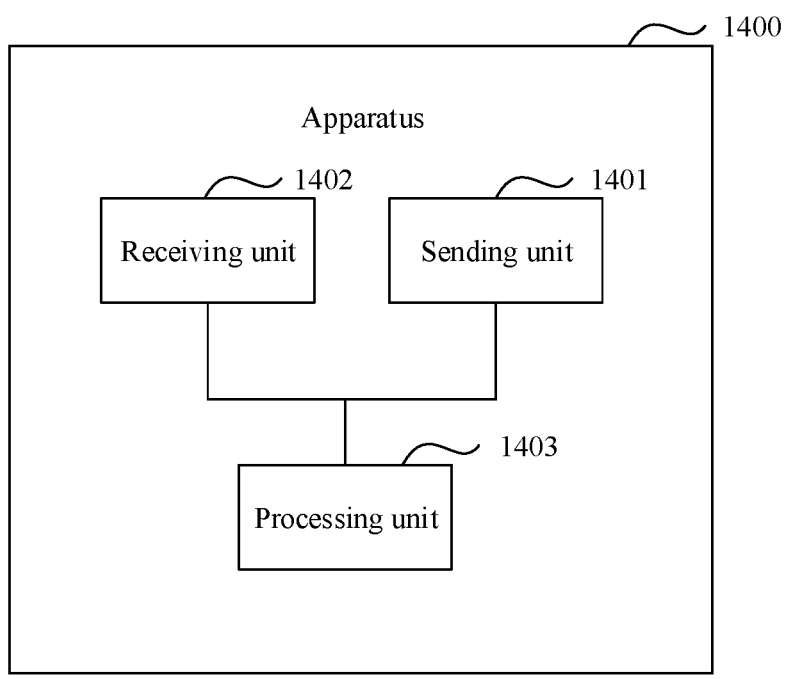
FIG. 14 is another schematic diagram of a structure of an apparatus according to this application.

Based on a same inventive concept as the method embodiments, an embodiment of this application further provides an apparatus. The apparatus is used in an access controller. The apparatus 1400 may be specifically a processor, a chip, a chip system, a function module, or the like in the access controller. Referring to FIG. 14, the apparatus 1400 may include a sending unit 1401, a receiving unit 1402, and a processing unit 1403. The sending unit 1401 is used by the apparatus 1400 to send information, the receiving unit 1402 is used by the apparatus 1400 to receive information, and the processing unit 1403 is configured to control and manage actions of the apparatus 1400. The processing unit 1403 may be further configured to indicate a processing process related to the access controller (for example, a WBAC) in any one of the foregoing embodiments and/or another process in the technical solutions described in this application. Specifically, the processing unit 1403 may control operations performed by the sending unit 1401 and the receiving unit 1402. For details, refer to the foregoing embodiments. Repeated parts are not described in detail herein again.

When being implemented by hardware, the processing unit 1403 may be a processor, a processing circuit, or the like; the sending unit 1401 may be a transmitter, a transmitter circuit, or the like; the receiving unit 1402 may be a receiver, a receiver circuit, or the like. The sending unit 1401 and the receiving unit 1402 may constitute a transceiver.

Figure 15:
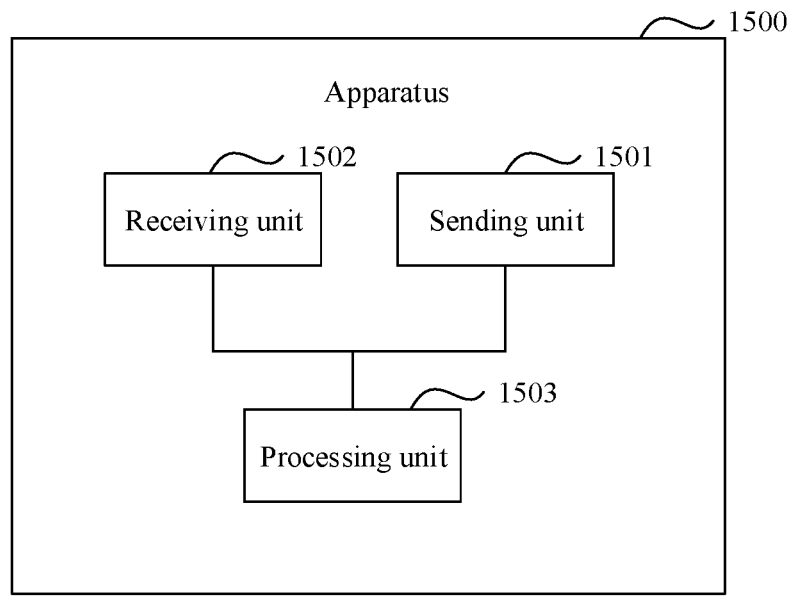
FIG. 15 is another schematic diagram of a structure of an apparatus according to this application.

Based on a same inventive concept as the method embodiments, an embodiment of this application further provides an apparatus. The apparatus is used in a target access device. The apparatus 1500 may be specifically a processor, a chip, a chip system, a function module, or the like in the target access device. Referring to FIG. 15, the apparatus 1500 may include a sending unit 1501, a receiving unit 1502, and a processing unit 1503. The sending unit 1501 is used by the apparatus 1500 to send information, the receiving unit 1502 is used by the apparatus 1500 to receive information, and the processing unit 1503 is configured to control and manage actions of the apparatus 1500. The processing unit 1503 may be further configured to indicate a processing process related to the target access device (for example, a T WBAP) in any one of the foregoing embodiments and/or another process in the technical solutions described in this application. Specifically, the processing unit 1503 may control operations performed by the sending unit 1501 and the receiving unit 1502. For details, refer to the foregoing embodiments. Repeated parts are not described in detail herein again.

When being implemented by hardware, the processing unit 1503 may be a processor, a processing circuit, or the like; the sending unit 1501 may be a transmitter, a transmitter circuit, or the like; the receiving unit 1502 may be a receiver, a receiver circuit, or the like. The sending unit 1501 and the receiving unit 1502 may constitute a transceiver.

It should be noted that, in the embodiments of this application, division into the units is an example, is merely logical function division, and there may be other divisions without departing from embodiments disclosed herein. Function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The software product is stored in a storage medium and includes several instructions for instructing a computer device (which may be a personal computer, a server, or a network device) or a processor to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Figure 16:
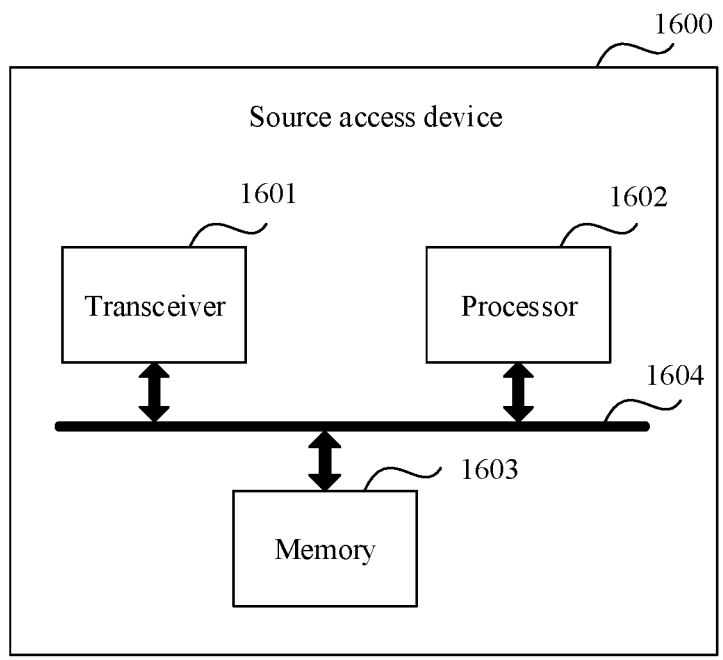
FIG. 16 is a diagram of a structure of a source access device according to this application.

Based on the foregoing embodiments, an embodiment of this application further provides another source access device, configured to implement the communication method. Referring to FIG. 16, the source access device 1600 may include a transceiver 1601 and a processor 1602. Optionally, the source access device 1600 may further include a memory 1603. The memory 1603 may be disposed inside the source access device 1600, or may be disposed outside the source access device 1600. The processor 1602 controls the transceiver 1601 to send and receive data, and is configured to implement the method performed by the source access device (for example, an S WBAP) in FIG. 4 to FIG. 10B.

Specifically, the processor 1602 may be a central processing unit (CPU), a network processor (NP), or a combination of a CPU and an NP. The processor 1602 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The transceiver 1601, the processor 1602, and the memory 1603 are connected to each other. Optionally, the transceiver 1601, the processor 1602, and the memory 1603 are connected to each other through a bus 1604. The bus 1604 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 16, but this does not mean that there is only one bus or only one type of bus.

For example, when implementing the communication method shown in FIG. 4, the source access device may specifically include:

the transceiver 1601, configured to send and receive data;

the processor 1602, configured to: control the transceiver 1601 to send a first message to an access controller, where the first message is used to request to hand over a terminal device to a target access device, and the first message includes a multicast service context of the terminal device; control the transceiver 1601 to receive a fifth message from the access controller, where the fifth message is used to respond to the message used to request to hand over the terminal device to the target access device, and the fifth message includes indication information indicating whether to forward multicast service data.

In an embodiment, the processor 1602 is further configured to determine, based on the fifth message, whether the target access device subscribes to a multicast service currently performed by the terminal device.

In an embodiment, the processor 1602 is further configured to: when the target access device does not subscribe to the multicast service currently performed by the terminal device, notify the terminal device to subscribe to, through the target access device, the multicast service currently performed by the terminal device.

In an embodiment, when determining, based on the fifth message, whether the target access device subscribes to the multicast service currently performed by the terminal device, the processor 1602 is specifically configured to:

when the fifth message further includes an identifier of a multicast service currently subscribed to or carried by the target access device, determine, based on the identifier of the multicast service currently subscribed to or carried by the target access device, whether the target access device subscribes to the multicast service currently performed by the terminal device; or when the fifth message further includes information indicating that the target access device does not subscribe to the multicast service currently performed by the terminal device, determine, based on the information, that the target access device does not subscribe to the multicast service currently performed by the terminal device; or when the indication information included in the fifth message indicates to forward the multicast service data, determine that the target access device does not subscribe to the multicast service currently performed by the terminal device.

In an embodiment, when the indication information indicates to forward the multicast service data, the processor 1602 is further configured to:
  when the fifth message further includes a forwarding tunnel endpoint identifier of the target access device, establish, based on the forwarding tunnel endpoint identifier of the target access device, a tunnel for forwarding the multicast service data; or
  when the fifth message further includes a forwarding tunnel endpoint identifier of the access controller, establish, based on the forwarding tunnel endpoint identifier of the access controller, a tunnel for forwarding the multicast service data.

In an embodiment, when the indication information indicates to forward the multicast service data, the processor 1602 is further configured to: control the transceiver 1601 to receive an eighth message from the access controller, where the eighth message is used to request to stop transmission of the data; delete the tunnel for forwarding the multicast service data.

In an embodiment, when the indication information indicates to forward the multicast service data, the processor 1602 is further configured to:
  when controlling the transceiver 1601 to send the multicast service data to the target access device for the first time, start a data forwarding timer;
  when the data forwarding timer expires, control the transceiver 1601 to send a ninth message to the target access device and delete the tunnel for forwarding the multicast service data, where the ninth message is used to indicate that the data has been forwarded; or
  when the data forwarding timer expires, control the transceiver 1601 to send a tenth message to the target access device through the access controller, and delete the tunnel for forwarding the multicast service data, where the tenth message is used to indicate that the data has been forwarded.

In an embodiment, the memory 1603 is configured to store a program and the like. Specifically, the program may include program code, and the program code includes computer operation instructions. The memory 1603 may include a RAM, and may further include a non-volatile memory (non-volatile memory), for example, one or more magnetic disk memories. The processor 1602 executes the application program stored in the memory 1603 to implement the foregoing function, to implement the communication method provided in the embodiments of this application.

Figure 17:
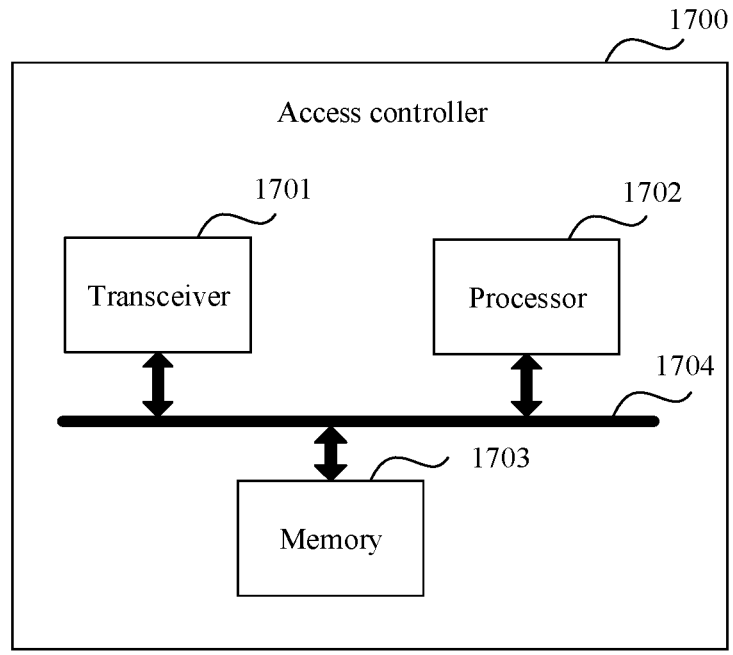
FIG. 17 is a diagram of a structure of an access controller according to this application.

Based on the foregoing embodiments, an embodiment of this application further provides another access controller, configured to implement the foregoing communication method. Referring to FIG. 17, the access controller 1700 may include a transceiver 1701 and a processor 1702. Optionally, the access controller 1700 may further include a memory 1703. The memory 1703 may be disposed inside the access controller 1700, or may be disposed outside the access controller 1700. The processor 1702 controls the transceiver 1701 to send and receive data, and is configured to implement the method performed by the access controller (for example, a WBAC) in FIG. 4 to FIG. 10B.

Specifically, the processor 1702 may be a CPU, an NP, or a combination of a CPU and an NP. The processor 1702 may further include a hardware chip. The hardware chip may be an ASIC, a PLD, or a combination thereof. The PLD may be a CPLD, an FPGA, a GAL, or any combination thereof.

The transceiver 1701, the processor 1702, and the memory 1703 are connected to each other. Optionally, the transceiver 1701, the processor 1702, and the memory 1703 are connected to each other through a bus 1704. The bus 1704 may be a PCI bus, an EISA bus, or the like. The bus may be classified into an address bus, a data bus, a control bus, or the like. For ease of representation, only one thick line is used to represent the bus in FIG. 17, but this does not mean that there is only one bus or only one type of bus.

For example, when implementing the communication method shown in FIG. 4, the access controller 1700 may specifically include:
  the transceiver 1701, configured to send and receive data;
  the processor 1702, configured to: control the transceiver 1701 to receive a first message from a source access device, where the first message is used to request to hand over a terminal device to a target access device, and the first message includes a multicast service context of the terminal device;
  control the transceiver 1701 to send a second message to the target access device, where the second message includes the multicast service context of the terminal device;
  control the transceiver 1701 to receive a fourth message from the target access device, where the fourth message is used to respond to the message used to request to hand over the terminal device to the target access device;
  control the transceiver 1701 to send a fifth message to the source access device, where the fifth message is used to respond to the message used to request to hand over the terminal device to the target access device, and the fifth message includes indication information indicating whether to forward multicast service data.

In an embodiment, that the fifth message includes indication information indicating whether to forward multicast service data includes:
  when the fourth message includes the indication information indicating whether to forward the multicast service data, the processor 1702 includes, in the fifth message, the indication information that indicates whether to forward the multicast service data and that is included in the fourth message; or
  the processor 1702 includes, in the fifth message based on whether the target access device subscribes to a multicast service currently performed by the terminal device, the indication information indicating whether to forward the multicast service data.

In an embodiment, the processor 1702 is further configured to: when determining that the target access device does not subscribe to the multicast service currently performed by the terminal device, add the target access device to the multicast service currently performed by the terminal device.

In an embodiment, when the processor 1702 determines that a protocol of a tunnel that is for transmitting the multicast service data and that is between the access controller and the target access device is GTP-U, the second message further includes first multicast tunnel establishment information, where the first multicast tunnel establishment information is used to establish the tunnel for transmitting the multicast service data.

In an embodiment, when the indication information indicates to forward the multicast service data, the fourth message further includes a forwarding tunnel endpoint identifier of the target access device, and the fifth message further includes the forwarding tunnel endpoint identifier of the target access device; or the fourth message further includes a forwarding tunnel endpoint identifier of the target access device, and the fifth message further includes a forwarding tunnel endpoint identifier of the access controller.

In an embodiment, when the indication information indicates to forward the multicast service data, the processor 1702 is further configured to: control the transceiver 1701 to receive an eighth message from the target access device, where the eighth message is used to request to stop transmission of the data; control the transceiver 1701 to send the eighth message to the source access device.

In an embodiment, when the indication information indicates to forward the multicast service data, the processor 1702 is further configured to: control the transceiver 1701 to receive a tenth message from the source access device, where the tenth message is used to indicate that the data has been forwarded; control the transceiver 1701 to forward the tenth message to the target access device.

In an embodiment, the memory 1703 is configured to store a program and the like. Specifically, the program may include program code, and the program code includes computer operation instructions. The memory 1703 may include a RAM, and may further include a non-volatile memory (non-volatile memory), for example, one or more magnetic disk memories. The processor 1702 executes the application program stored in the memory 1703 to implement the foregoing function, to implement the communication method provided in the embodiments of this application.

Figure 18:
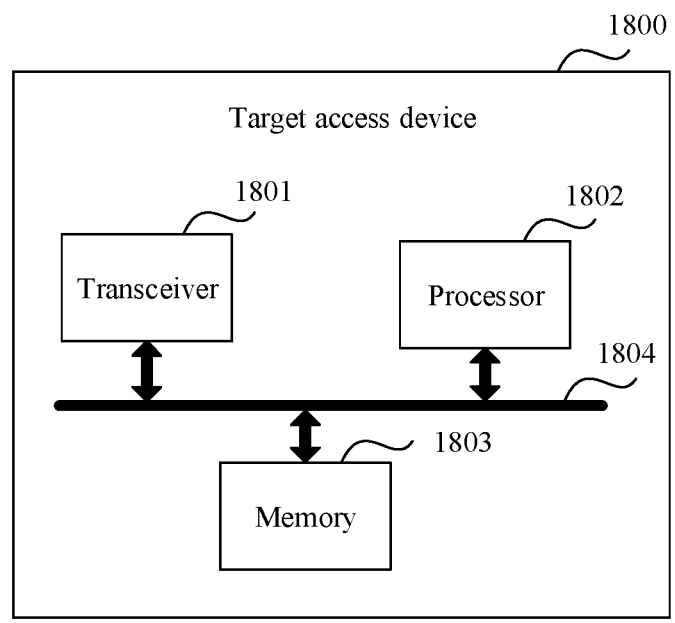
FIG. 18 is a diagram of a structure of a target access device according to this application.

Based on the foregoing embodiments, an embodiment of this application further provides another target access device, configured to implement the foregoing communication method. Referring to FIG. 18, the target access device 1800 may include a transceiver 1801 and a processor 1802. Optionally, the target access device 1800 may further include a memory 1803. The memory 1803 may be disposed inside the target access device 1800, or may be disposed outside the target access device 1800. The processor 1802 controls the transceiver 1801 to send and receive data, and is configured to implement the method performed by the target access device (for example, a T WBAP) in FIG. 4 to FIG. 10B.

Specifically, the processor 1802 may be a CPU, an NP, or a combination of a CPU and an NP. The processor 1802 may further include a hardware chip. The hardware chip may be an ASIC, a PLD, or a combination thereof. The PLD may be a CPLD, an FPGA, a GAL, or any combination thereof.

The transceiver 1801, the processor 1802, and the memory 1803 are connected to each other. Optionally, the transceiver 1801, the processor 1802, and the memory 1803 are connected to each other through a bus 1804. The bus 1804 may be a PCI bus, an EISA bus, or the like. The bus may be classified into an address bus, a data bus, a control bus, or the like. For ease of representation, only one thick line is used to represent the bus in FIG. 18, but this does not mean that there is only one bus or only one type of bus.

For example, when implementing the communication method shown in FIG. 4, the target access device may specifically include:
the transceiver 1801, configured to send and receive data;
the processor 1802, configured to: control the transceiver 1801 to receive a second message from an access controller, where the second message includes a multicast service context of a terminal device;
control the transceiver 1801 to send a fourth message to the access controller, where the fourth message is used to respond to a message used to request to hand over the terminal device to the target access device.

In an embodiment, the fourth message includes indication information indicating whether to forward multicast service data.

In an embodiment, the second message further includes first multicast tunnel establishment information, where the first multicast tunnel establishment information is used to establish a tunnel for transmitting the multicast service data.

In an embodiment, the fourth message further includes second multicast tunnel establishment information, where the second multicast tunnel establishment information is used to establish the tunnel for transmitting the multicast service data.

In an embodiment, the fourth message further includes a forwarding tunnel endpoint identifier of the target access device.

In an embodiment, after controlling the transceiver 1801 to receive the second message from the access controller, the processor 1802 is further configured to:
when determining, based on the multicast service context of the terminal device, that the processor 1802 does not subscribe to a multicast service currently performed by the terminal device, control the transceiver 1801 to send a third message to a multicast source device, where the third message is used to subscribe to the multicast service currently performed by the terminal device.

In an embodiment, the processor 1802 is further configured to: when controlling the transceiver 1801 to receive the multicast service data from a source access device, start a data forwarding timer;
when the data forwarding timer expires, start a tunnel deletion timer and control the transceiver 1801 to send an eighth message to the access controller, where the eighth message is used to request to stop transmission of the data;
when the tunnel deletion timer expires, delete a tunnel for forwarding the multicast service data.

In an embodiment, the processor 1802 is further configured to:
after controlling the transceiver 1801 to receive a ninth message from the source access device, delete the tunnel for forwarding the multicast service data, where the ninth message is used to indicate that the data has been forwarded; or
after controlling the transceiver 1801 to receive, from the access controller, a tenth message from the source access device, delete the tunnel for forwarding the multicast service data, where the tenth message is used to indicate that the data has been forwarded.

In an embodiment, the processor 1802 is further configured to:
when controlling the transceiver 1801 to receive the multicast service data from the source access device, start the data forwarding timer; when the data forwarding timer expires, delete the tunnel for forwarding the multicast service data.

In an embodiment, the memory 1803 is configured to store a program and the like. Specifically, the program may include program code, and the program code includes computer operation instructions. The memory 1803 may include a RAM, and may further include a non-volatile memory (non-volatile memory), for example, one or more magnetic disk memories. The processor 1802 executes the application program stored in the memory 1803 to implement the foregoing function, to implement the communication method provided in the embodiments of this application.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, to implement a function in any one or more of the foregoing embodiments, for example, obtain or process information or a message in the foregoing methods. Optionally, the chip further includes a memory. The memory is configured to store program instructions and data that are executed by the processor. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read-only memory (CD-ROM), an optical memory, and the like) that include computer usable program code.

This application is described with reference to the flowcharts and/or block diagrams of the method, the device, the system, and the computer program product according to the embodiments disclosed herein. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may alternatively be stored in a computer-readable memory that can indicate the computer or the another programmable data processing device to work in a manner, so that the instructions stored in the computer-readable memory generate an artifact that includes an instruction apparatus. The instruction apparatus implements the function in one or more processes in the flowcharts and/or in one or more blocks in the block diagrams.

These computer program instructions may alternatively be loaded onto a computer or another programmable data processing device, so that a series of operations and operations are performed on the computer or the another programmable device, thereby generating computer-implemented processing. Therefore, the instructions executed on the computer or the another programmable device provide an operation for implementing the function in one or more processes in the flowcharts and/or in one or more blocks in the block diagrams.

It is clear that a person skilled in the art can make various modifications and variations to embodiments of this application without departing from the scope of this application. This application is intended to cover these modifications and variations of the embodiments of this application provided that they fall within the scope of protection defined by the following claims and their equivalent technologies.

What is claimed is:

1. A communication method, comprising:
    sending, by a source access device, a first message to an access controller, wherein the first message is used to request hand over of a terminal device to a target access device, and the first message comprises a multicast service context of the terminal device;
    receiving, by the source access device, a fifth message from the access controller, wherein the fifth message is used to respond to the first message, and the fifth message comprises first indication information indicating whether to forward multicast service data;
    determining, by the source access device and based on the fifth message, whether the target access device subscribes to a multicast service currently performed by the terminal device; and
    when the target access device does not subscribe to the multicast service, notifying, by the source access device, the terminal device to subscribe to the multicast service through the target access device.

2. The method of claim 1, wherein the determining, by the source access device and based on the fifth message, whether the target access device subscribes to the multicast service currently performed by the terminal device comprises:
    when the fifth message further comprises an identifier of a multicast service currently subscribed to by the target access device or carried by the target access device, determining, by the source access device and based on the identifier, whether the target access device subscribes to the multicast service currently performed by the terminal device; or
    when the fifth message further comprises second indication information indicating that the target access device does not subscribe to the multicast service currently performed by the terminal device, determining, by the source access device and based on the second indication information, that the target access device does not subscribe to the multicast service currently performed by the terminal device; or
    when the first indication information indicates to forward the multicast service data, determining, by the source access device, that the target access device does not subscribe to the multicast service currently performed by the terminal device.

3. The method of claim 1, wherein when the first indication information indicates to forward the multicast service data, the method further comprises:
    when the fifth message further comprises a forwarding tunnel endpoint identifier of the target access device, establishing, by the source access device and based on the forwarding tunnel endpoint identifier of the target access device, a tunnel for forwarding the multicast service data; or
    when the fifth message further comprises a forwarding tunnel endpoint identifier of the access controller, establishing, by the source access device and based on the forwarding tunnel endpoint identifier of the access controller, a tunnel for forwarding the multicast service data.

4. The method of claim 3, wherein when the first indication information indicates to forward the multicast service data, the method further comprises:
receiving, by the source access device, an eighth message from the access controller, wherein the eighth message is used to request to stop transmission of the multicast service data; and
deleting, by the source access device, the tunnel for forwarding the multicast service data.

5. The method of claim 3, wherein when the first indication information indicates to forward the multicast service data, the method further comprises:
when sending the multicast service data to the target access device for a first time, starting, by the source access device, a data forwarding timer; and
when the data forwarding timer expires:
sending, by the source access device, a ninth message to the target access device, and deleting the tunnel for forwarding the multicast service data, wherein the ninth message is used to indicate that the multicast service data has been forwarded; or
sending, by the source access device, a tenth message to the target access device through the access controller, and deleting the tunnel for forwarding the multicast service data, wherein the tenth message is used to indicate that the multicast service data has been forwarded.

6. A communication method, comprising:
receiving, by a target access device, a second message from an access controller, wherein the second message comprises a multicast service context of a terminal device;
sending, by the target access device, a fourth message to the access controller, wherein the fourth message is used to respond to a message used to request hand over of the terminal device to the target access device; and
after the target access device receives the second message:
when the target access device determines, based on the multicast service context of the terminal device, that the target access device does not subscribe to a multicast service currently performed by the terminal device, sending, by the target access device, a third message to a multicast source device, wherein the third message is used to subscribe to the multicast service currently performed by the terminal device.

7. The method of claim 6, wherein the fourth message comprises indication information indicating whether to forward multicast service data.

8. The method of claim 7, wherein the fourth message further comprises second multicast tunnel establishment information, and the second multicast tunnel establishment information is used to establish a tunnel for transmitting the multicast service data.

9. The method of claim 7, wherein the fourth message further comprises a forwarding tunnel endpoint identifier of the target access device.

10. The method of claim 6, wherein the second message further comprises first multicast tunnel establishment information, and the first multicast tunnel establishment information is used to establish a tunnel for transmitting multicast service data.

11. The method of claim 6, further comprising:
when receiving multicast service data from a source access device, starting, by the target access device, a data forwarding timer;
when the data forwarding timer expires, starting, by the target access device, a tunnel deletion timer, and sending an eighth message to the access controller, wherein the eighth message is used to request to stop transmission of the multicast service data; and
when the tunnel deletion timer expires, deleting, by the target access device, a tunnel for forwarding the multicast service data.

12. The method of claim 6, further comprising:
after receiving a ninth message from a source access device, deleting, by the target access device, a tunnel for forwarding multicast service data, wherein the ninth message is used to indicate that the multicast service data has been forwarded; or
after receiving, from the access controller, a tenth message from a source access device, deleting, by the target access device, a tunnel for forwarding the multicast service data, wherein the tenth message is used to indicate that the multicast service data has been forwarded.

13. The method of claim 6, further comprising:
when receiving multicast service data from a source access device, starting, by the target access device, a data forwarding timer; and
when the data forwarding timer expires, deleting, by the target access device, a tunnel for forwarding the multicast service data.

14. A communication method, comprising:
receiving, by a terminal device, a sixth message from a source access device, wherein the sixth message comprises notification information of subscribing to a multicast service currently performed by the terminal device; and
sending, by the terminal device and based on the sixth message, a seventh message to a target access device, wherein the seventh message is used to indicate that the target access device does not subscribe to the multicast service currently performed by the terminal device, or the seventh message is used to request that the target access device subscribes to the multicast service currently performed by the terminal device,
wherein in response to receiving the seventh message, the target access device sends a nineteenth message to the multicast source device, wherein the nineteenth message indicates that the multicast source device adds the target access device to the multicast service currently performed by the terminal device.

* * * * *